United States Patent [19]

Kawachi et al.

[11] Patent Number: 4,750,799
[45] Date of Patent: Jun. 14, 1988

[54] HYBRID OPTICAL INTEGRATED CIRCUIT

[75] Inventors: Masao Kawachi; Yasufumi Yamada, both of Mito; Mitsuho Yasu, Katsuta; Hiroshi Terui; Morio Kobayashi, both of Mito, all of Japan

[73] Assignee: Nippon Telegraph and Telephone Corporation, Tokyo, Japan

[21] Appl. No.: 753,632

[22] Filed: Jul. 10, 1985

[30] Foreign Application Priority Data

| Aug. 10, 1984 | [JP] | Japan | 59-167677 |
| Oct. 5, 1984 | [JP] | Japan | 59-209080 |
| Nov. 13, 1984 | [JP] | Japan | 59-239203 |
| Dec. 3, 1984 | [JP] | Japan | 59-255371 |
| Apr. 19, 1985 | [JP] | Japan | 60-82633 |

[51] Int. Cl.$^4$ .................... G02B 6/12; G02B 6/10
[52] U.S. Cl. .................... 350/96.11; 350/96.10; 350/96.12; 350/320
[58] Field of Search ............... 350/96.11, 96.12, 96.13, 350/96.15, 96.17, 96.18, 320

[56] References Cited

U.S. PATENT DOCUMENTS

| 3,386,787 | 2/1968 | Kaplan | 350/96.10 |
| 3,542,536 | 6/1970 | Flam et al. | 350/96.12 |
| 3,806,223 | 11/1974 | Keck et al. | 350/96.12 |
| 3,873,339 | 1/1975 | Hudson | 117/17 |
| 3,934,061 | 3/1976 | Keck et al. | 427/165 |
| 4,169,009 | 9/1979 | Wagner et al. | 350/96.12 |
| 4,326,771 | 4/1982 | Henry et al. | 350/96.12 |
| 4,360,246 | 12/1982 | Figueroa et al. | 350/96.12 |
| 4,547,262 | 10/1985 | Spillman, Jr. et al. | 350/96.12 X |

FOREIGN PATENT DOCUMENTS 58847 8/1973 Japan .
53453 5/1974 Japan .

OTHER PUBLICATIONS

"Taper Coupling between 7059-Glass and Cds Films and Phase Modulation in the Composite Waveguide Structure" by Applied Physics Letters, vol. 28, No. 3, 1 Feb. 1976.

"Gallium arsenide laser-array-on-silicon package"; J. D. Crow et al., Applied Optics, vol. 17, No. 3, Feb. 1, 1978, pp. 479-485.

"Flame Hydrolysis Deposition of $SiO_2$—$TiO_2$ Glass Planar Optical Waveguides on Silicon", M. Kowachi et al., Japanese Journal of Applied Physics, vol. 22, No. 12 (1983), p. 1932.

"Optical Fibre Coupling to High-Silica Channel Waveguides with Fibre-guiding grooves", Y. Yamada et al., Electronics Letters; vol. 20, No. 8, 4/12/84, p. 313-314.

"Fabrication of a High Silica Glass Waveguide Optical Accessor," Yamada et al., Electronic Letters, vol. 20, No. 14, 7/5/84, p. 589-591.

(List continued on next page.)

Primary Examiner—William L. Sikes
Assistant Examiner—Akm E. Ullah
Attorney, Agent, or Firm—Spencer & Frank

[57] ABSTRACT

A hybrid optical integrated circuit having a high-silica glass optical waveguide formed on a silicon substrate, an optical fiber and an optical device coupled optically to the optical waveguide, and an optical fiber guide and an optical device guide on the substrate for aligning the optical fiber and the optical device at predetermining positions, respectively, relative to the optical waveguide. Islands carrying electrical conductors are disposed on the substrate. A first electrical conductor film is formed on the substrate. Second electrical conductor films are formed on the top surfaces of the optical waveguide, the optical fiber guide, the optical device guide and the islands and are electrically isolated from the first electrical conductor film. An electrical conductor member is provided to feed electric power from the first and second electric conductor films to the optical device which needs the power supply. The optical waveguide, the optical fiber guide, the optical device guide and the islands are formed from the same high-silica glass optical waveguide film. Alignment of various portions is facilitated when assembling the circuit. A high coupling efficiency is realized with a low cost.

12 Claims, 20 Drawing Sheets

OTHER PUBLICATIONS

"Fabrication of SiO$_2$—TiO$_2$ Glass Planar Optical Waveguides by Flame Hydrolysis Deposition", M. Kawachi et al., Electronics Letters, vol. 19, No. 15, 7/21/83, p. 583–584.

"Optical Circuit and its Production", Patent Absts. of Japan, vol. 7, No. 54 (P-180) (1199) 3/4/83.

"Integrated-Optical Circuits Achieved by Planar Technology on Silicon Substrates: Application to the Optical Spectrum Analyser", IEE Proceedings, vol. 131, No. 5, Old Woking, Survey, GB; S. Valette et al., pp. 325–331.

"Fabrication of Flip-Chip Optical Couplers Between Single Node Fibers and LiNbO$_3$ Channel Waveguides" C. H. Bulmer et al., 31st Electronic Components Conf., Atlanta, Ga., May 11–13, 1981, pp. 109–113.

Y. Yamada et al., "Optical-Fibre Coupling to High--Silica Channel Waveguides with Fiber-Guiding Grooves"; Reprinted from Electronics Letters, Apr. 12th, 1984, vol. 20, No. 8, pp. 313–314.

Y. Yamada et al., "Fabrication of a High-Silica Glass Waveguide Oprical Accessor"; Reprinted from Electronics Letters; Jul. 5th, 1984, vol. 20, No. 14; pp. 589–591.

A. L. McWhorter "Electromagnetic Theory of the Semiconductor Junction Laser" Solid-State Electronics Pergamon Press 1963, vol. 6, pp. 417–423.

Goell et al. "Sputtered Glass Waveguide for Integrated Optical Circuits" Bell System Technical Jouranal, Dec. 1969.

Goell et al. "Integrated Optical Circuits" Proceedings of the IEEE, vol. 58, No. 10, Oct. 1970.

Japanese Patent Application Laid-Open No. 57-84, 189 published May 26th, 1982, and Abridged English Language Translation.

Japanese Patent Application No. 58-147,378 published Aug. 12th, 1983; and Corresponding English Language Translation.

Gloge "Optical Waveguide Transmission" Proceedings of the IEEE, vol. 58, No. 10, Oct. 1970.

HYBRID OPTICAL INTEGRATED CIRCUIT

BACKGROUND OF THE INVENTION

FIELD OF THE INVENTION

The present invention relates to a hybrid optical integrated circuit in which an optical waveguide and an active optical device such as a light source, a light detector and so on are mounted on the same substrate and a method for fabricating such hybrid optical integrated circuits.

DESCRIPTION OF THE PRIOR ART

As a result of the recent development of optical communications systems, various optical components such as optical branching and mixing circuits, wavelength demultiplexers and multiplexers and so on are required to be mass-produced and supplied at a low cost. So far the optical components are of a bulk type comprising in combination a prism, a lens, a filter and so on, but they have poor productivity because it takes a long time to assemble and adjust the optical components. As a result, they are expensive and it is difficult to make them compact in size and light in weight. Therefore, the development of optical communications systems into various fields has been adversely impeded.

In order to overcome the above-described problems, various attempts have been made to provide planar waveguide type optical devices in the form of an optical integrated circuit, but in this case it is extremely difficult to couple an optical waveguide whose film thickness is of the order of one micron to an optical fiber. Therefore, such attempts have remained as a dim idea and so far no satisfactory means for fabricating such optical integrated circuits has been proposed.

In view of the above, attempts have been made to combine a miniaturized prism or lens with a light source and a detector to form an integral module, thereby providing an optical integrated circuit which is compact in size and inexpensive to manufacture, but the prism and lens have no waveguide structure so that in assembly they must be aligned with each other with a higher degree of accuracy. Thus, the above-described problems have not been overcome yet.

Practical optical integrated circuits may be generally divided into a monolithic structure and a hybrid structure. The monolithic structure is such that all the required optical devices such as light emitting devices, optical waveguides and light detectors are made of the same material (for instance, InGaAsP series) and fabricated on the same substrate. The hybrid structure is such that light emitting devices and light detectors are mounted on a substrate upon which an optical waveguide is formed, whereby an optical integrated circuit is provided. For instance, an optical waveguide is formed on a substrate and a light source and a light detector (for instance, InP series or GaAs series semiconductor devices) are disposed at the ends of the optical waveguide, respectively. Such hybrid optical integrated circuits as described above have a great advantage in that optical waveguides can be made of a material having an extremely low degree of loss (such as high-silica glass). On the other hand, in the case of the monolithic optical integrated circuits, the optical waveguides are made of a semiconductor material. But, such a semiconductor material has a high degree of absorption loss. Furthermore, a thick film waveguide adapted for use in multimode optical circuits cannot be made of a semiconductor material. As a consequence, only the hybrid optical integrated circuits are feasible at present.

Attempts at fabricating hybrid optical integrated circuits by incorporating active optical devices such as light sources and light detectors on the substrate on which a low-loss optical waveguide is formed have been made for a long time, but they have remained as a dim idea. Thus, there have not been provided hybrid optical integrated circuits which can be practically and satisfactorily used in optical communications.

In order to fabricate the hybrid optical integrated circuit, the following three steps are required:

(1) the first step in which an optical waveguide is formed on a substrate;

(2) the second step in which optical fibers and active optical devices are disposed at predetermined positions at the ends of the optical waveguide; and (3) the third step in which power supply lead wires or the like are connected to the active optical devices.

For instance, Japanese patent application Laid-open No. 57-84189 disclosed a hybrid optical integrated circuit in which, in order to satisfy the above-described first and second steps, optical fibers and other optical devices are disposed in a groove formed in the surface of a substrate. In this case, in order to align the groove with an optical waveguide formed on the substrate, a mask alignment step is required. However, the optical waveguide is raised by a height of several tens of micron meters above the surface of the substrate, so that a mask cannot be placed close to the surface of the substrate. As a result, the mask alignment is extremely difficult.

Y. Yamada et al. disclosed in "Optical-fiber coupling to high-silica channel waveguides with fibre-guiding grooves", Electronics Letters, Apr. 12, 1984, Vol. 20, No. 8, pp. 313–314 that a planar waveguide of $SiO_2$–$TiO_2$ is formed on a silica glass substrate and then a channel waveguide and guiding grooves for guiding an optical fiber are simultaneously formed by reactive ion etching (RIE) technique.

Furthermore, Y. Yamada et al. disclosed in "Fabrication of a high silica glass waveguide optical accessor", Electronics Letters, July 5, 1984, Vol. 20, No. 14, pp. 589–591 an optical accessor in which a $SiO_2$–$TiO_2$ planar waveguide is formed on a silica glass substrate and then a waveguide having input and output ports and branching and mixing ports and guiding grooves for guiding optical fibers are simultaneously formed by the RIE technique.

As disclosed in the above-described papers, the connection method in which guides for aligning optical fibers are formed simultaneously with the patterning of an optical circuit on a high-silica glass optical waveguide and the optical waveguide and the optical fiber are connected by utilizing such guides ensures a high-efficiency connection between the optical fiber and the optical waveguide without the need of cutting and polishing the ends of the optical waveguide and without the need of alignment between the optical fiber and the optical waveguide.

However, when an optical fiber having an outer diameter of 125 $\mu$m and a core diameter of 50 $\mu$m is connected to an optical waveguide, the high-silica glass optical waveguide must be etched to a depth of about 90 $\mu$m to accommodate the optical fiber. In the etching process, amorphous Si (a-Si) is used as a mask and the mixture gas consisting of $C_2F_6$ and $C_2H_4$ is used as an etchant to perform reactive ion etching. However, when such an etching method is used to etch a groove to a depth as deep as 90 μm, a long etching time is needed and hence there arises another problem that the width of the optical waveguide thus formed is considerably narrower than the width of the pattern used in the photomasking step. In order to prevent the decrease in pattern width, so far an optical circuit has been etched to a depth of about 70 μm and an optical fiber whose one end is so etched that the clad has an outer diameter of about 70 μm is inserted into guiding grooves to perform the connection.

When silica glass is used as a substrate, the coefficient of thermal expansion of a glass film deposited on the surface of the substrate is higher than that of silica, so that the glass film is subjected to tensile stress with respect to the substrate and consequently the glass film is likely to be cracked. Therefore, the composition of the glass film must be selected to prevent cracking.

Furthermore, in the hybrid optical integrated circuit of the type described above, spatial wiring using gold wires must be employed in order to supply power to active optical devices. As a result, in the case of a hybrid optical integrated circuit which has a relatively large chip area as compared with electronic integrated circuits, the length of the gold wires is more than a few millimeters, so that there arises a reliability problem because of instability resulting from mechanical vibrations.

In order to overcome the above-described problem, it would be considered to provide a pattern of electrical conduction paths over the surface of a substrate, but, as described hereinbefore, the top surfaces of the optical waveguide and the guides are as high as several tens of micron meters above the surface of the substrate, so that there arises the problem that it is extremely difficult to carry out the photolithographic process for forming the pattern of electrical conduction paths, including the step of coating photoresist. It may be proposed to form a pattern of electrical conduction paths prior to the formation of an optical waveguide film over the surface of the substrate, but there arises again the problem that the underlying pattern is broken when the high-silica optical waveguide is formed at such a high temperature above 1200° C.

Meanwhile, in order to provide a hybrid optical integrated circuit, it is required that an optical waveguide and optical components are coupled to each other on the same substrate. In this case, if the size of a light spot of the optical waveguide is largely different from that of a light spot of a light emitting device, a lens must be interposed between the optical waveguide and the light emitting device so as to convert the size of the light spot, thereby increasing the coupling efficiency. However, there arises the problem that it is extremely difficult to optically align the optical waveguide, the lens and the light emitting device when they are disposed on the same substrate. As a result, there has not been provided yet a hybrid optical integrated circuit having a light emitting device and an optical waveguide which are coupled to each other with a high degree of coupling efficiency as described above.

In the hybrid optical integrated circuit, in order to couple an optical waveguide to a light source such as a semiconductor laser, light-emitting diode and a light detector such as a photodiode or the like with a high degree of efficiency, there has been proposed a method in which optical fibers are interposed between the optical waveguide on the one hand and the light source and the light detector on the other hand. According to this method, one end of the optical fiber is connected to one end of the optical waveguide, while the other end of the optical fiber is connected to the light source or light detector. However, according to this method, the optical fiber of 10 cm through 1 m in length is extended between the optical waveguide on the one hand and the light source or light detector on the other hand, so that the optical waveguide device cannot be made compact in size. Especially, in the field of optical information processing, the time delay of light caused by the optical fiber of 10 cm–1 m in length is disadvantageous in that the information processing speed by optical devices is limited.

In order to overcome the above-described problem, there has been proposed a method in which a light source and a light detector are directly coupled to the ends of an optical waveguide, respectively.

FIGS. 1A and 1B are used to explain a prior art example of this coupling method. Reference numeral 101 designates a silica glass substrate; 102, an optical waveguide; and 103, a semiconductor laser. FIG. 1A shows an example in which the semiconductor laser 103 and the optical waveguide 102 are coupled to each other by utilizing one end surface 101a of the substrate 101, while FIG. 1B shows an example in which the optical waveguide 102 and the semiconductor laser 103 are optically coupled to each other at a suitable position on the same substrate 101 without being limited to the end surface 101a of the substrate 101.

In the coupling method as shown in FIG. 1A, the semiconductor laser 103 can be replaced with a light emitting diode or a light detecting photodiode. This coupling method is very simple, but has a defect that the coupling point is limited only to the end surface 101a of the substrate so that some problem or limitation of design arises when an optical circuit is designed.

According to the method as shown in FIG. 1B, the semiconductor laser 103 is disposed on the substrate 101 at any desired position, but there arises the problem that it would be difficult to couple a flat optical component having a flat light emitting or receiving surface (as shown in FIG. 2) such as a light-emitting diode or a photodiode instead of the semiconductor laser 103 shown in FIG. 1B to the optical waveguide. FIG. 2 shows an example of the structure of a light emitting or receiving device having a flat light emitting or receiving surface. The light emitting or receiving device comprises a semiconductor substrate 121 of 1 mm × 1 mm and a light receiving or emitting surface 122 of 100 μm in diameter. It is impossible to couple such light emitting or receiving device as shown in FIG. 2 to the end of the optical waveguide 102 having a height of about several μm through 100 μm on the substrate 101 as shown in FIG. 1B. That is, the method as shown in FIG. 1B may be applied only to a device such as a semiconductor laser which emits or receive the light in a direction which is parallel with the surfaces of a semiconductor substrate, but cannot be applied to an optical device which emits or receives the light in the direction perpendicular to the surface of the semiconductor substrate.

SUMMARY OF THE INVENTION

The present invention, therefore, has for its object to provide a hybrid optical integrated circuit which overcomes the above and other problems encountered in the prior art optical integrated circuits and has a higher degree of productivity so that the fabrication cost can be decreased and which can be made compact in size.

Another object of the present invention is to provide a hybrid optical integrated circuit which overcomes the above-described problems and arranges patterns of electrical conduction paths in a practically applicable manner.

Yet another object of the present invention is to provide a hybrid optical integrated circuit in which an optical waveguide is coupled optically to a light emitting device and a light receiving device on the same substrate with a high degree of coupling efficiency.

A further object of the present invention is to provide a hybrid optical integrated circuit in which the depth of an etched portion of an optical waveguide film formed on a substrate is minimized while an additional depth is provided by etching the substrate.

A still further object of the present invention is to provide a method for fabricating a hybrid optical integrated circuit in which an optical waveguide, optical fibers and guides for optical devices are simultaneously formed on a silicon substrate.

Yet another object of the present invention is to provide a method for fabricating a hybrid optical integrated circuit which overcomes the above-described problems and in which patterns of electrical conduction paths are formed by using a single photomask with a high degree of alignment accuracy and with a high degree of reliability, thereby facilitating the assembly of the hybrid optical integrated circuit.

A further object of the present invention is to provide a method for fabricating a hybrid optical integrated circuit in which an optical waveguide and other optical devices are optically coupled to each other on the same substrate with a high degree of efficiency.

A still further object of the present invention is to provide a method for fabricating a hybrid optical integrated circuit in which the depth of an etched portion of an optical waveguide formed on a substrate is minimized while an additional depth is added by etching the substrate.

In order to achieve these objects, in accordance with the first aspect of the present invention, a hybrid optical integrated circuit comprises:

a silicon substrate;

a high-silica glass optical waveguide formed on the silicon substrate;

an optical fiber and an optical device coupled optically to the optical waveguide;

an optical fiber guide and an optical device guide on the substrate for aligning the optical fiber and the optical device at predetermined positions, respectively, relative to the optical waveguide; and the optical waveguide, the optical fiber guide and the optical device guide being formed from the same high-silica glass optical waveguide film.

In accordance with the second aspect of the present invention, a hybrid optical integrated circuit comprises:

a silicon substrate;

a high-silica glass optical waveguide formed on the silicon substrate;

an optical fiber and an optical device coupled optically to the optical waveguide;

an optical fiber guide and an optical device guide on the substrate for aligning the optical fiber and the optical device at predetermined positions, respectively, relative to the optical waveguide;

islands disposed on the silicon substrate;

a first electrical conductor film formed on the silicon substrate;

second electrical conductor films formed on the top surfaces of the optical waveguide, the optical fiber guide, the optical device guide and the islands and electrically isolated from each other;

an electrical conductor member for feeding electric power from the first and second electric conductor films to the optical device which needs the power supply; and the optical waveguide, the optical fiber guide, the optical device guide and the islands being formed from the same high-silica glass optical waveguide film.

Here, the thickness of the core layer of the optical waveguide can be substantially equal to the core diameter of the optical fiber.

The width and thickness of the core of the optical waveguide can be 50±5 μm and input and output fibers can be coupled to the optical waveguide.

The optical waveguide can be of the step index type. The width and thickness of the core layer of the optical waveguide can be 40±3 μm. Input and output fibers can be coupled to the optical waveguide.

Alternatively, the optical waveguide can be of the graded index type in the direction of thickness thereof. The thickness and width of the core layer of the optical waveguide can be 50±5 μm and 40±3 μm, respectively. Input and output fibers can be coupled to the optical waveguide.

There may be provided a micro-reflecting mirror with a reflecting surface inclined at about 45° relative to the surface of the substrate. The mirror can be disposed at a position adjacent to the end surface of the optical waveguide, so that the optical waveguide and the optical device are optically coupled to each other through the micro-reflecting mirror.

In addition, there may be provided a marker for determining the position of the optical device and for holding the optical device. The marker can be disposed on the substrate around the micro-reflecting mirror, so that the optical device is mounted on the marker.

In accordance with the third aspect of the present invention, a hybrid optical integrated circuit comprises:

a silicon substrate;

a high-silica glass optical waveguide formed on the silicon substrate;

an optical fiber and an optical device coupled optically to the optical waveguide;

an optical fiber guide and an optical device guide on the substrate for aligning the optical fiber and the optical device at predetermined positions, respectively, relative to the optical waveguide;

a lens disposed at one end surface of the optical waveguide for optically coupling the optical device thereto;

a lens guide disposed on the silicon substrate for aligning the lens at a predetermined position relative to the optical waveguide; and the optical waveguide, the optical fiber guide, the optical device guide and the lens guide being formed from the same high-silica glass film.

In accordance with the fourth aspect of the present invention, a hybrid optical integrated circuit comprises;

a silicon substrate;

a high-silica glass optical waveguide formed on the silicon substrate;

an optical fiber and an optical device coupled optically to the optical waveguide;

an optical fiber guide and an optical device guide on the substrate for aligning the optical fiber and the optical device at predetermined positions, respectively, relative to the optical waveguide; and at least a portion of the silicon substrate in the vicinity of the optical fiber guide being etched to a predetermined depth, so that when the optical fiber is inserted into the optical fiber guide, the core of the optical fiber is optically aligned with the core of the optical waveguide.

The side surfaces of the optical waveguide may have cladding.

The junction between the optical waveguide and the optical fiber and the junction between the optical waveguide and the optical device may be covered with a refractive-index-matching agent.

In accordance with the fifth aspect of the present invention, there is provided a method for fabricating a hybrid optical integrated circuit having a high-silica glass optical waveguide formed on a substrate, an optical fiber and an optical device coupled optically to the optical waveguide, and an optical fiber guide and an optical device guide on the substrate for aligning the optical fiber and the optical device at predetermined positions, respectively, relative to the optical waveguide; comprising:

using a silicon substrate as the substrate; and comprising the steps of:

forming a high-silica glass optical waveguide on the silicon substrate;

simultaneously forming the optical waveguide, the optical fiber guide and the optical device guide on the silicon substrate by etching the optical waveguide film; and fitting the optical fiber and the optical device into the optical fiber guide and the optical device guide, respectively.

There may further comprise the steps of:

depositing a quartz glass film on the optical waveguide, the optical fiber guide and the optical device guide formed by the etching step, and over the exposed surface of the silicon substrate; and effecting the reactive ion etching process to selectively remove the portions of the quartz glass film deposited on the top surfaces of the optical waveguide, the optical fiber guide, the optical device guide and the silicon substrate.

After disposing the optical fiber and the optical device on the silicon substrate, the junction between the optical waveguide and the optical fiber and the junction between the optical waveguide and the optical device can be covered with a refractive-index-matching agent.

In accordance with the sixth aspect of the present invention, there is provided a method for fabricating a hybrid optical integrated circuit having a high-silica glass optical waveguide formed on a substrate, an optical fiber and an optical device coupled optically to the optical waveguide, and an optical fiber guide and an optical device guide on the substrate for aligning the optical fiber and the optical device at predetermined positions, respectively, relative to the optical waveguide, comprising:

using a silicon substrate as the substrate, and comprising the steps of:

forming a high-silica glass optical waveguide on the silicon substrate;

simultaneously forming the optical waveguide, the optical fiber guide, the optical device guide and islands;

forming electrical conductor films on the top surfaces of the silicon substrate, the optical waveguide, the optical fiber guide, the optical device guide and the islands;

fitting the optical fiber and the optical device into the optical fiber guide and the optical device guide, respectively; and forming a path for supplying electrical power to the optical device which requires a power supply, through the electrical conductor films.

There may further comprise the steps of:

depositing a quartz glass film on the optical waveguide, the optical fiber guide, an optical device guide and electrical conductor carrying islands, formed by the etching step, and over the exposed surface of the silicon substrate; and effecting the reactive ion etching process to selectively remove the portions of the quartz glass film deposited on the top surfaces of the optical waveguide, the optical fiber guide, the optical device guide, the islands and the silicon substrate.

In accordance with the seventh aspect of the present invention, there is provided a method for fabricating a hybrid optical integrated circuit in which an optical waveguide is formed on a substrate and an active optical device is coupled to the optical waveguide; comprising:

using a silicon substrate as the substrate; and comprising the steps of:

forming an optical waveguide film on the silicon substrate;

etching the optical waveguide film to simultaneously form the optical waveguide, alignment guides for positioning an optical fiber and an active optical device relative to the optical waveguide and islands for supplying or receiving power to or from the active optical device;

coating electrical conductor films on the islands; and fitting the optical fiber and the active optical device into the alignment guides, respectively.

In these methods for fabricating a hybrid optical integrated circuit, the optical waveguide can be formed by the soot process. The etching step can be performed by the reactive ion etching process.

In accordance with the eighth aspect of the present invention, there is provided a method for fabricating a hybrid optical integrated circuit having a high-silica glass optical waveguide formed on a substrate, an optical fiber and an optical device coupled optically to the optical waveguide, and an optical fiber guide and an optical device guide on the substrate for aligning the optical fiber and the optical device at predetermined positions, respectively, relative to the optical waveguide, comprising:

using a silicon substrate as the substrate; and comprising the steps of:

forming a high-silica glass optical waveguide on the silicon substrate;

etching the high-silica glass optical waveguide by the photolithography process until the surface of the silicon substrate is exposed to simultaneously form the optical waveguide and the optical fiber guide; and etching at least a portion of the silicon substrate adjacent to the optical fiber guide to a predetermined depth, so that when the optical fiber is inserted into the optical fiber guide, the core of the optical fiber is optically aligned with the core of the optical waveguide.

In accordance with the ninth aspect of the present invention, there is provided a method for fabricating a hybrid optical integrated circuit having a high-silica glass optical waveguide formed on a substrate, an optical fiber and first and second optical devices coupled optically to the optical waveguide, and an optical fiber guide and optical device guides on the substrate for aligning the optical fiber and the optical devices at predetermined positions, respectively, relative to the optical waveguide, comprising:

using a silicon substrate as the substrate; and comprising the steps of:

forming a high-silica glass optical waveguide on the silicon substrate;

simultaneously forming the optical waveguide, the optical fiber guide, the optical device guides and a marker for determining the position of the first optical device to be disposed on the silicon substrate and for holding the first optical device;

fitting the optical fiber and the first optical device into the optical fiber guide and the optical device guide, respectively;

mounting the second optical device on the marker; and disposing a reflecting mirror for optically coupling the second optical device to the optical waveguide on the silicon substrate along the optical device guide.

In the tenth aspect of the present invention, there is provided a method for fabricating a hybrid optical integrated circuit having a high-silica glass optical waveguide formed on a substrate, an optical fiber and an optical device coupled optically to the optical waveguide, and an optical fiber guide and an optical device guide on the substrate for aligning the optical fiber and the optical device at predetermined positions, respectively, relative to the optical waveguide, comprising:

using a silicon substrate as the substrate; and comprising the steps of:

forming a high-silica glass optical waveguide on the silicon substrate;

simultaneously forming the optical waveguide, the optical fiber guide, the optical device guide and a lens guide for positioning at a predetermined position on the silicon substrate a lens which optically couples the optical device to the optical waveguide; and fitting the optical fiber, the optical device and the lens along the optical fiber guide, the optical device guide and the lens guide, respectively.

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

Figure 1A:
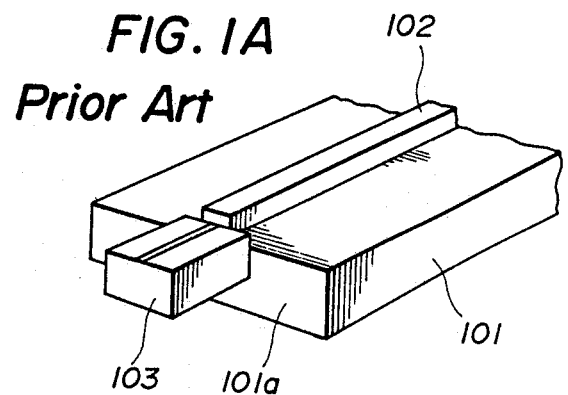
FIGS. 1A and 1B are perspective views used to explain prior art methods for coupling an optical waveguide to a light source or a light detector.
Figure 1B:
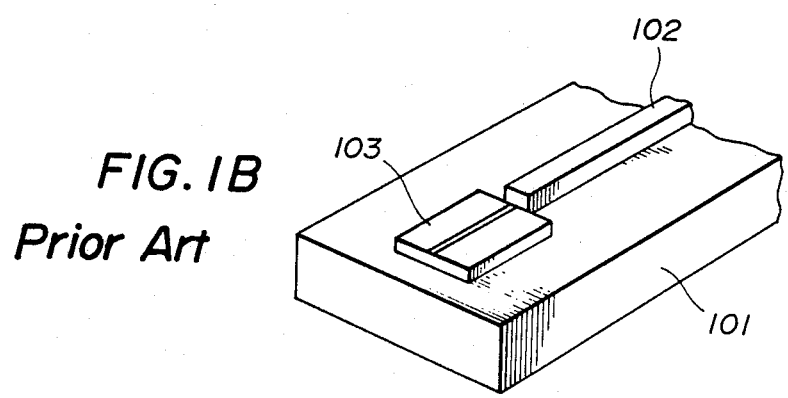
Figure 2:
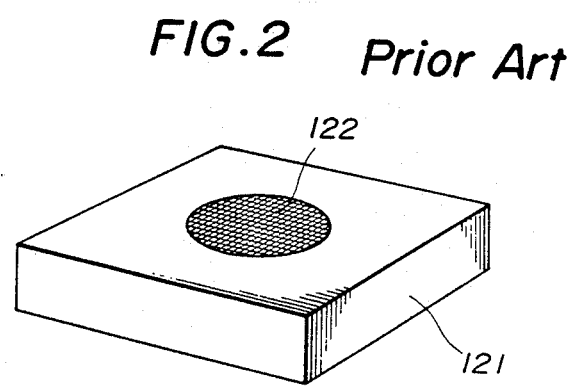
FIG. 2 is a perspective view showing a light source or a light detector with a flat light emitting or receiving surface.
Figure 3:
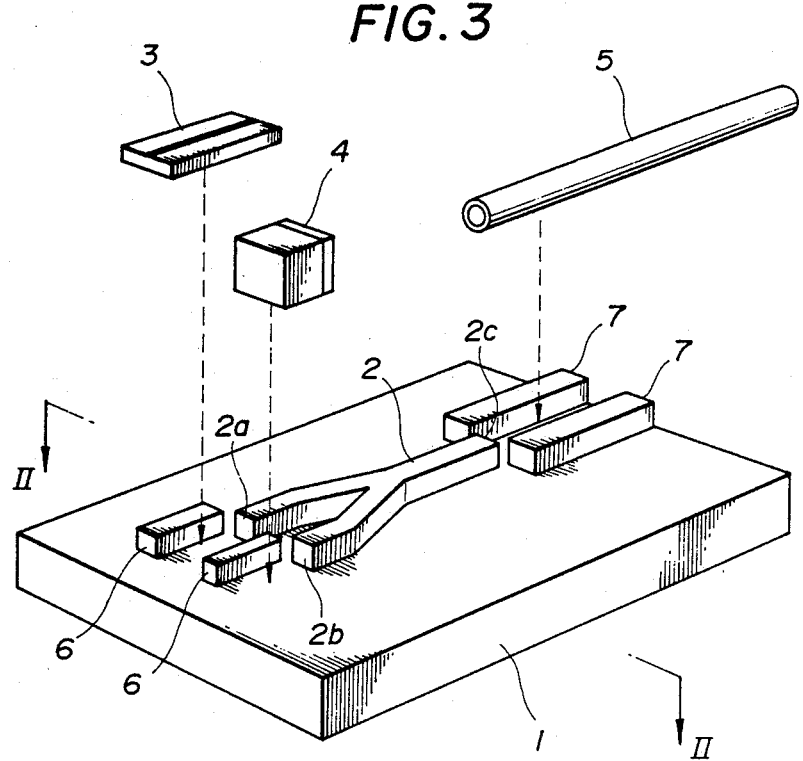
FIG. 3 is a perspective view showing an embodiment of the present invention.

FIG. 3 shows an embodiment of the present invention for the case in which an optical module having an optical waveguide is formed for use in bidirectional communication. Reference numeral 1 designates a silicon substrate; 2, a high-silica, i.e., silica based optical waveguide; 3, a semiconductor laser as a light-emitting device; 4, a light detector; 5, an optical fiber; 6, guides for aligning the semiconductor laser 3; and 7, guides for aligning the optical fiber 5. The high-silica glass optical waveguide 2 is in the form of a Y and has three end faces 2a, 2b and 2c. The semiconductor laser which is inserted between the guides 6 and bonded to the silicon substrate 1 is coupled to the end face 2a. The light detector 4 which is bonded to the silicon substrate 1 is coupled to the end face 2b. The optical fiber 5 which is inserted between the guides 7 is coupled to the end face 2c.

In operation, a driving current is applied to the semiconductor laser 3 to oscillate the laser 3. Further, lead wires are omitted and not shown in FIG. 3. A signal light from the semiconductor laser 3 is introduced through the end face 2a into the high-silica glass optical waveguide 2 and transmitted through the end face 2c into the optical fiber 5. On the other hand, a light signal from the optical fiber 5 is transmitted through the end face 2c into the high-silica glass optical waveguide 2 and a part of the light signal thus transmitted is introduced into one branch of the Y-shaped optical waveguide and is detected through the end face 2b by the light detector 4.

The heat generated by the semiconductor laser 3 is dissipated into the silicon substrate 1 which has a high thermal conductivity, so that the continuous operation of the semiconductor laser 3 can be ensured.

Next, the structure of each optical device will be described in more detail.

Figure 4A:
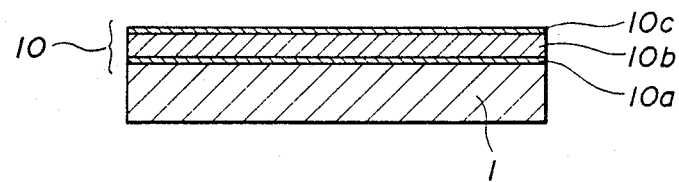
FIG. 4A is a cross sectional view taken along the line II—II of FIG. 3 and showing an optical waveguide before it is etched in the steps for fabricating a high-silica glass optical waveguide.
Figure 4B:
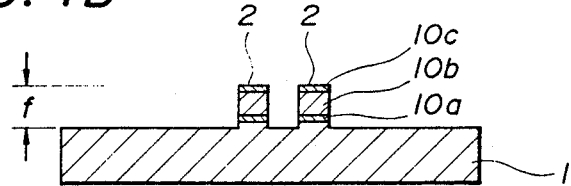
FIG. 4B is a cross sectional view taken along the line II—II of FIG. 3 and showing the optical waveguide after etching.

FIGS. 4A and 4B are sectional views used to explain the steps for fabricating the high-silica glass optical waveguide 2. To fabricate the optical waveguide 2, first a high-silica glass optical waveguide film 10 is formed on the silicon substrate 1. The undesired portion of the high-silica glass optical waveguide film 10 is removed by the reactive ion etching process using a fluorine series gas, thereby leaving the optical waveguide 2. To form the high-silica glass optical waveguide film 10, the method disclosed in the co-pending patent application entitled "A Method for Fabricating Optical Waveguide Films" and filed by the same applicant (Japanese patent application No. 58-147378) may be used. That is, the flame hydrolysis reaction of glass raw materials such as $SiCl_2$ or $TiCl_4$ is utilized to deposit a film of fine glass particles on the silicon substrate and the film of the fine glass particles is heated in an electric furnace to consolidate into transparent glass.

According to this method, a small amount of P and B is normally doped into the film of fine glass particles in order to lower the vitrification temperature of the film of fine glass particles. However, the inventors found out the fact that in the case of vitrification of the film of fine glass particles, B and P diffuse into the surface of the silicon substrate, so that the impurity density at the portion close to the surface of the substrate becomes $3 \times 10^{19}$ cm $^{-3}$, resulting in a considerable decrease in the surface resistance. In view of the above fact, it is preferable that dopants such as B and P are not used when the semiconductor laser is disposed on the silicon substrate 1 and a pattern of electrical conduction paths is formed over the silicon substrate 1.

As shown in FIG. 4A, the optical waveguide film 10 usually comprises a buffer layer 10a, a core layer 10b and a cladding layer 10c. The refractive index of each layer can be controlled by varying the amount of Ti doped into the film of fine glass particles. In this case, when Ti is uniformly doped into the core layer 10b, a step type profile of refractive index can be obtained, but when the amount of doped Ti is continuously varied in the direction of the thickness of the core layer 10b, a graded type profile of refractive index can be obtained in the direction of the thickness of the film. Instead of Ti, Ge may be used as a dopant for controlling the refractive index.

The thickness of the core layer 10b is optimumly selected so that the coupling loss becomes minimum when the optical waveguide is coupled with the optical fiber, the semiconductor laser or light-emitting device or the light detector, as will be described in more detail hereinafter.

It is advantageous to form the guides 6 and 7 by leaving some portions of the optical waveguide film 10 as the guides 6 and 7 when the optical waveguide film 10 is etched as shown in FIG. 4B. In this case, the photolithography process using a single photomask can attain the transfer of the patterns of both the optical waveguide and the guides with a higher degree of accuracy, so that the alignment between the optical waveguide 2 and the guides 6 and 7 can be automatically attained.

Next, the method for bonding the semiconductor laser 3 and the light detector 4 on the silicon substrate 1 will be described. First, an Au-Sn alloy is deposited on the surface of the silicon substrate 1 at desired positions and the optical devices having the shapes adapted to snugly fit the guides 6 and 7 are bonded to the silicon substrate 1 by means of contact bonding with heat. In the first embodiment shown in FIG. 3, no special guide means are provided for the light detector 4, because the light receiving area of the light detector 4 is relatively large, so that the alignment between the light receiving surface of the detector 4 and the end face 2b of the optical waveguide 2 can be attained relatively in a simple manner. However, if necessary, guides like the guides 6 may be provided for the detector 4.

The reason why the high-silica glass optical waveguide 2 is used in the present invention is that the high-silica glass optical waveguide 2 having a thickness of several tens μm can be formed on the silicon substrate 1 in a stable manner and accordingly from the standpoint of dimensions and materials the high-silica optical waveguide is advantageously coupled to the high-silica optical fibers which are generally used.

Figure 7:
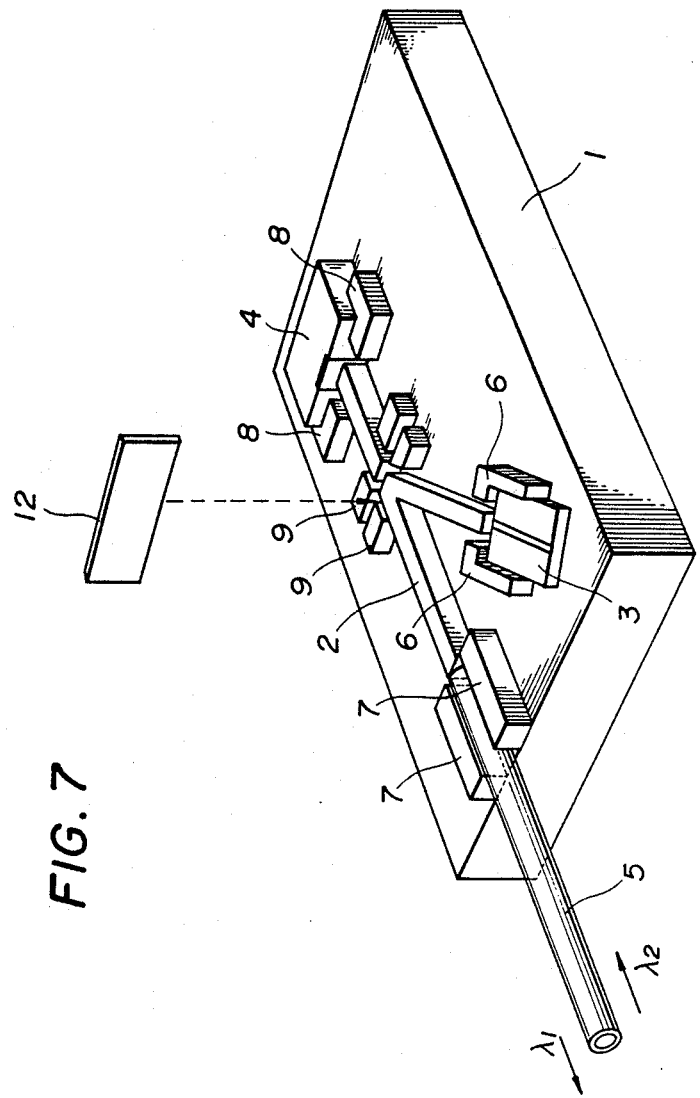
FIG. 7 is a perspective view showing a third embodiment of the present invention.

Referring still to FIG. 4A, it was found out that the size of the core layer 10b of the optical waveguide 2 can be optimumly selected as follows based upon ray optic analysis in the case of a multi-mode optical waveguide. That is, in the case of the structure consisting of a light-emitting device, a light detector, an optical waveguide and an optical fiber coupled to each other in this order, as shown in FIG. 7, the thickness h of the optical waveguide can be of the order of 50μ m, while the width thereof can be of the order of 50μ m when the optical waveguide is of a step or graded type. If the increase in loss of 0.2 dB from an optimum condition is permitted, a tolerance of ±5μ m is allowed.

Figure 5A:
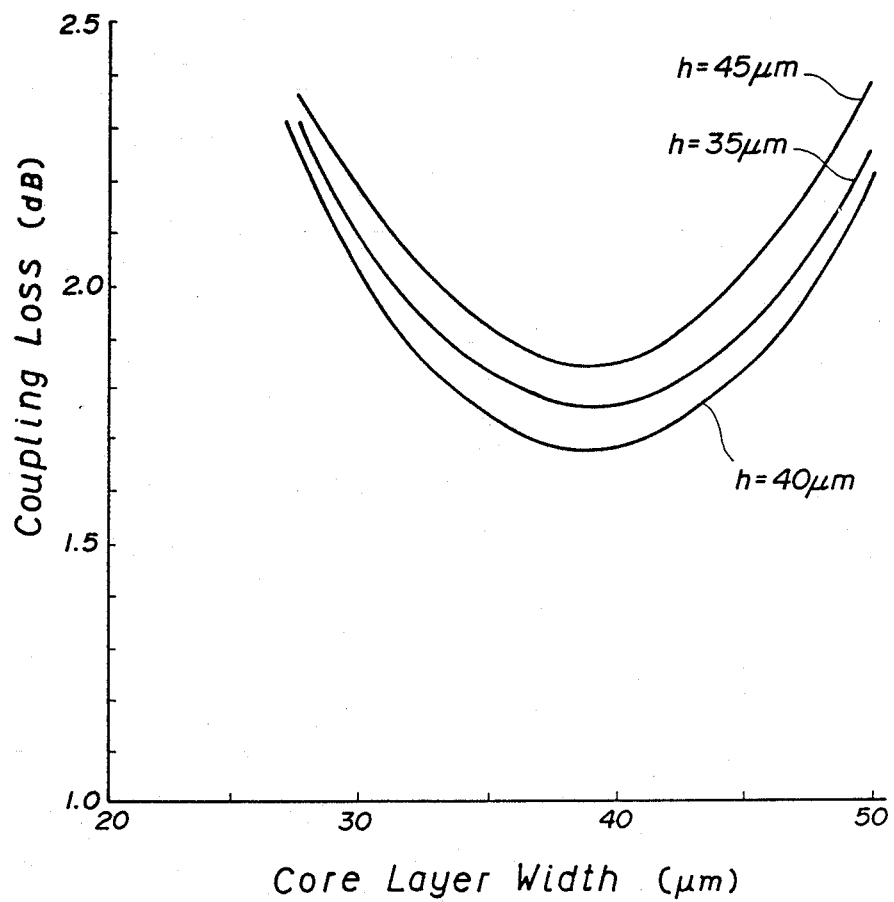
FIG. 5A is a graph illustrating characteristic curves showing the relationship between the core layer width in micron meter and the total coupling loss in dB when an optical fiber, an optical waveguide and another optical fiber are coupled to each other in the case of a step index type optical waveguide.
Figure 5B:
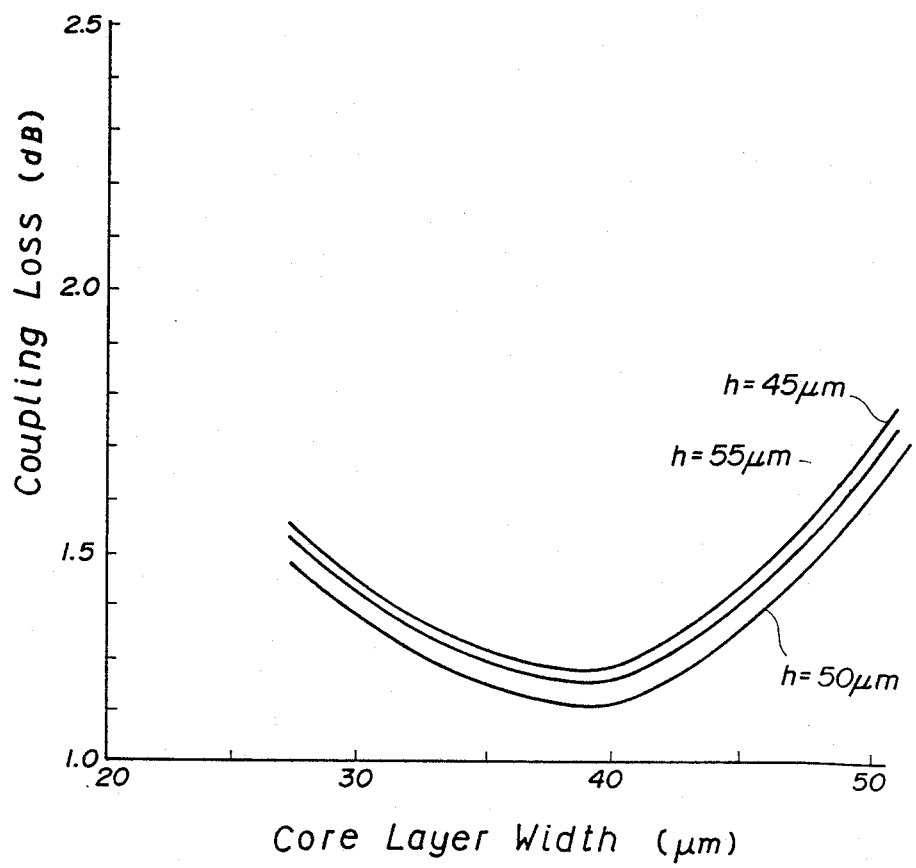
FIG. 5B is a graph illustrating characteristic curves showing the relationship between the core layer width in micron meter and the total coupling loss in dB when an optical fiber, an optical waveguide and another optical fiber are coupled to each other in the case of a graded index type optical waveguide.
Figure 8:
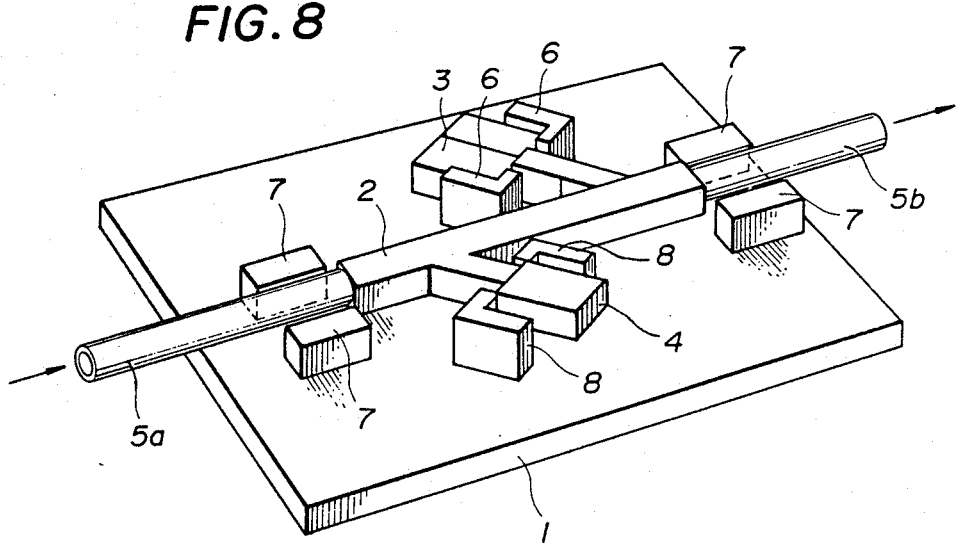
FIG. 8 is a perspective view showing a fourth embodiment of the present invention.

In the case of the structure consisting of an optical fiber, an optical waveguide and an optical fiber coupled to each other in this order, as shown in FIG. 8, the coupling loss is calculated as shown in FIGS. 5A and 5B. FIG. 5A illustrates the characteristic curves of the step type optical waveguide, while FIG. 5B illustrates the characteristic curves of the graded type optical waveguide. In FIGS. 5A and 5B, it is seen that in the case of the step type optical waveguide, it is sufficient that both the thickness and width are 40±3μ m and in the case of the graded type optical waveguide, it is sufficient that the thickness is 50±5μ m and the width is 40±3μ m. When the thickness and width are selected in the manner described above, the coupling loss can be limited to 1.8 dB or less in the case of the step type optical waveguides, while in the case of the graded type optical waveguides the coupling loss can be limited to 1.2 dB or less. The optical fiber used here was a conventional graded type optical fiber with a core diameter of 50μ m. In the case of a single mode type optical waveguide, it is preferable to select the thickness and width of the optical waveguide substantially equal to the core diameter of an optical fiber, so that the core field profile in the optical fiber coincides with that of the optical waveguide.

Next, the conditions for determining the thickness of the buffer layer 10a will be described. In the case of the reactive ion etching process using a fluorine series etching gas such as $C_2F_6$, if an undesired portion of the glass film is removed so that the silicon substrate 1 is exposed, etching will not proceed further. Therefore, the thickness of the buffer layer 10a is so selected that when the optical fiber 5 is inserted between the guides 7, the center of the core of the optical fiber 5 coincides with the center of the core layer 10b of the optical waveguide 2. For instance, assume that the optical fiber having an outer diameter of 70 μm and a core diameter of 50μ m is coupled to the optical waveguide 2 with a core diameter of 50 μm. Then, the thickness of the buffer layer 10a of the optical waveguide 2 must be determined to be 10 μm. If the increase in loss of 0.2 dB is permitted, a setting tolerance of ±3 μm can be allowed when determining the thickness of the buffer layer.

In this case, if the distance between the pair of guides 7 is selected to be 70-75 μm, the optical alignment can be automatically attained only by inserting the optical fiber between the guides 7. The optical fiber 5 can be securely fixed in position with an adhesive or by means of the melting process using a $CO_2$ laser.

When an optical fiber 5 having an outer diameter of 125 μm is coupled to the optical waveguide, it is sufficient that the depth f of etching is increased to about 95 μm and the distance between the guides 7 is increased to 125-130 μm.

From the standpoint of optical coupling, it is required that the thickness of the semiconductor laser 3 is so selected that when it is bonded on the silicon substrate 1, the height of its active layer is substantially positioned to the center of the core layer 10b of the optical waveguide 2. It follows, therefore, that it is preferable that the thickness of the semiconductor laser 3 is as thin as 50 μm. However, it is difficult from a viewpoint of handling to decrease the thickness of the semiconductor laser 3 less than 30 μm. It is, therefore, preferable to make a deep recess in a portion of the silicon substrate 1 where the semiconductor laser 3 is to be bonded, by a selective dry etching process or chemical etching process.

Figure 6:
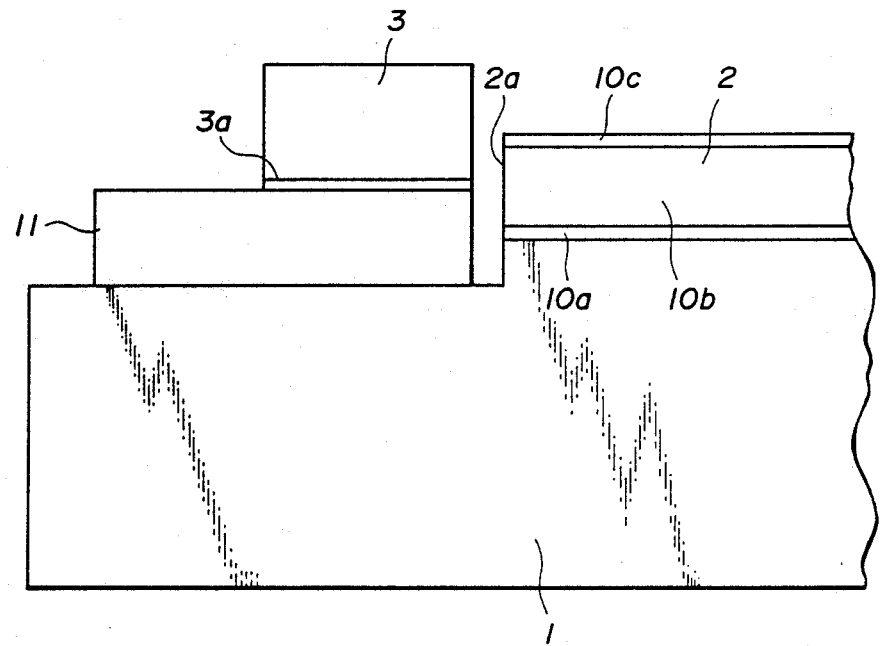
FIG. 6 is a partial side view showing a second embodiment of the present invention in which a semiconductor laser is disposed on a silicon substrate.

FIG. 6 is a side view of another embodiment in which the semiconductor laser 3 is mounted on the silicon substrate 1. Here, a spacer 11 having a high thermal conductivity is interposed between the silicon substrate 1 and the semiconductor laser 3. The active layer 3a is brought into contact with the spacer 11. The spacer 11 also serves to adjust the height of the semiconductor laser 3 with respect to the height of the optical waveguide 2. The spacer 11 may be a thin silicon plate or a thin diamond plate.

In order to increase the coupling efficiency between the semiconductor laser 3 and the optical waveguide 2, it is preferable that the end surface of the optical waveguide 2 is machined or otherwise formed so that the end surface becomes circular or semispherical.

The distance between the semiconductor laser guides 6 is determined corresponding to the width of the semiconductor laser 3, so that the alignment between the semiconductor laser 3 and the optical waveguide 2 can be automatically attained. In this case, the insertion of the semiconductor laser 3 is further facilitated by widening the distance between the guides 6 as the distance from the end surface 2a of the optical waveguide 2 is increased.

FIG. 7 shows an optical module having waveguides and adapted for use in a wavelength multiplex communication system. A high-silica glass optical waveguide 2 and pairs of guides 6, 7, 8 and 9 are formed on a silicon substrate 1 at the same time. A semiconductor laser 3 is disposed between the pair of the guides 6. An optical fiber 5 is interposed between the pair of guides 7. A light detector 4 is disposed between the pair of guides 8. An interference film type wavelength filter 12 is inserted between the pair of the guides 9. The wavelength filter 12 has a wavelength selectivity, so that it reflects light having the wavelength $\lambda_1$ emitted from the semiconductor laser 3, but allows the transmission of light having the wavelength $\lambda_2$.

In operation, the semiconductor laser 3 is energized, so that the light signal with the wavelength $\lambda_1$ is transmitted to the optical waveguide 2. The light signal is then reflected by the filter 12, and then transmitted through the optical waveguide 2 to the optical fiber 5. The light signal with the wavelength $\lambda_2$ transmitted through the optical fiber 5 in the direction indicated by the arrow in FIG. 7 passes through the filter 12 toward the light detector 4. For instance, the wavelengths $\lambda_1$ and $\lambda_2$ can be selected as follows:

$\lambda_1 = 0.85$ μm and $\lambda_2 = 1.3$ μm $\lambda_1 = 0.81$ μm and $\lambda_2 = 0.89$ μm $\lambda_1 = 1.2$ μm and $\lambda_2 = 1.3$ μm This embodiment has the structure consisting of the light-emitting device, the light detector, the optical waveguide and the optical fiber, so that the thickness and the width of the core layer 10b of the optical waveguide 2 are determined to be about 50 μm.

The optical module as shown in FIG. 7 can be of course expanded into a multiple wavelength multiplexer/demultiplexer module provided with a plurality of lasers, a plurality of light detectors and a plurality of wavelength filters.

FIG. 8 shows a further embodiment of the present invention embodying an optical accessor used in a local area communication network. A high-silica glass optical waveguide 2 and pairs of guides 6, 7 and 8 are formed on a silicon substrate 1 at the same time. Then, a semiconductor laser 3 is disposed between the pair of the guides 6. Optical fibers 5a and 5b are inserted between the pair of the guides 7. A light detector 4 is inserted between the pair of the guides 8.

In operation, a signal light is transmitted from the optical fiber 5a into the optical waveguide 2 and a part of the signal light is branched toward the light detector 4, while the remaining signal light travels straight and is introduced into the optical fiber 5b. Furthermore, a signal light from the semiconductor laser 3 is joined to the remaining signal light travelling straight and is introduced into the optical fiber 5b. In this embodiment, in order to reduce the loss of the signal light transmitted from the optical fiber 5a through the optical waveguide 2 to the optical fiber 5b, the size of the core of the optical waveguide 2 must be optimized. The optimum conditions of the structure consisting of the optical fiber, the optical waveguide and the optical fiber can be applied to this case. When a step type optical waveguide is used, the thickness and the width of the core layer must be $40\pm3$ $\mu$m, while in the case of a graded type optical must be $50\pm5$ $\mu$m and $40\pm3$ $\mu$m, respectively.

So far, four embodiments of the present invention have been described. In the case of the first embodiment shown in FIG. 3, the angle between the bifurcated legs of the Y-shaped optical waveguide 2 is about 2° and all the components can be integrated on a substrate of $20\times3$ mm. In the case of the embodiment as shown in FIG. 7, the reflection angle is 30° and all the components are integrated on $10\times10$ mm substrate. These embodiments are by far smaller in size than the prior art bulk type optical device.

In the case of the waveguide type modules in accordance with the present invention, the same patterns can be repeatedly formed in a single photomask, so that a large number of patterns are formed at one step on a silicon wafer having a diameter of 3, 4 or 5 inches by the photolithography process and consequently these modules are suitable for mass production. Furthermore, the alignment between the optical waveguide, the optical fibers, the light-emitting element and the light detector can be accomplished within a short period of time. As a result, the optical components can be manufactured in an inexpensive manner. In addition, if necessary, semiconductor devices such as a drive circuit for driving the semiconductor laser, an amplifier for the light detector and the like can be mounted on a free space on the silicon substrate, so that the integration density of the optical components can be further increased.

In the case of etching of glass, the silicon substrate serves as a stopper so that the depth of etching can be determined with satisfactory reproducibility. Furthermore, variation in the direction of thickness of the etched surface is small. The silicon substrate has a good heat absorbing ability, so that a semiconductor device such as a semiconductor laser can be directly mounted on the silicon substrate which serves as a heat sink. In addition, since the coefficient of thermal expansion of silicon is higher than that of silica and the coefficient of thermal expansion of a glass film deposited on the silicon substrate is between these of silicon and silica, the glass film deposited on the silicon substrate is subjected to compression stresses, unlike a glass film deposited on a silica substrate. Consequently, the glass film is not subjected to cracking. As a result, the compositions of the glass films can be determined with a high degree of freedom.

Furthermore, the core size of the optical waveguide can be optimized, so that the waveguide type optical module with a low coupling loss can be provided.

The structures shown in FIGS. 3, 6, 7 and 8 can be encased in a package similar to those used to encapsulate electronic integrated circuits. Thus, the present invention greatly contributes to making optical communication transmitter and receiver compact in size and less expensive to fabricate.

In order to align the optical axis of the optical waveguide with the optical axes of the light-emitting device, the light detector or the optical fiber, they must be aligned in the three directions; that is, along the X, Y and Z axes. According to the present invention, the light-emitting device, the light detector or the optical fiber is merely brought into contact with the corresponding end surface of the optical waveguide, so that the alignment in the optical axis direction can be accomplished in a simple manner. Furthermore, the size of the light-emitting device, the light detector or the optical fiber can be selected corresponding to the thickness of the optical waveguide, so that the alignment in the vertical direction of the silicon substrate is accomplished also in a simple manner. After all, according to the present invention, in the case of the alignment between the optical waveguide and the light-emitting device, the light detector or the optical fiber, it is sufficient only to align them in one of the three X, Y and Z directions, in order to attain the precise alignment. Therefore, as compared with the prior bulk type optical components in which components must be correctly aligned in all the three directions, the present invention can facilitate the alignment between the components.

In the embodiments described above, a conventional optical element such as lens, prism or the like is not used, so that the optical integrated circuit in accordance with the present invention can be made compact in size.

Next, referring to FIGS. 9A, 9B through FIG. 15, embodiments of the present invention will be described in which in the case of optical coupling between an optical waveguide formed on a substrate and a light-emitting device or a light detector, a micro-reflecting mirror having a reflecting surface inclined at an angle of about 45° relative to the surface of the substrate is disposed on the substrate at a position adjacent to the end surface of the optical waveguide, so that the optical waveguide and the light-emitting device or the light detector can be optically coupled to the optical waveguide through the micro-reflecting mirror.

Figure 9A:
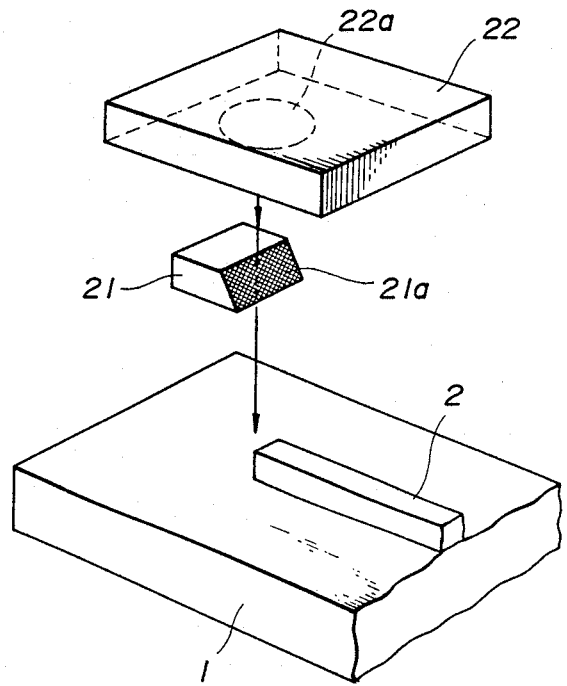
FIG. 9A is an explanatory view used to explain the optical coupling between a light source or a light detector and an optical waveguide in a fifth embodiment of the present invention.
Figure 9B:
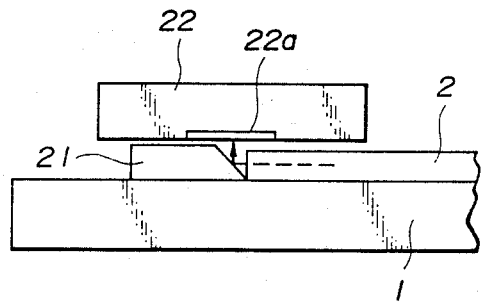
FIG. 9B is a side view showing an optical coupling portion in the fifth embodiment.

FIGS. 9A and 9B show one of such embodiments as described above. FIG. 9A is used to explain the coupling between a light-emitting device or a light detector and an optical waveguide, while FIG. 9B is a side view showing an optical coupling. Here, reference numeral 21 denotes a micro-reflecting mirror; and 22, a light-emitting device or a light detector. The same reference numerals are used to designate similar parts in FIGS. 9A, 9B, 10, 11, 12, 13, 14 and 15. The micro-reflecting mirror 21 is disposed on the substrate 1 adjacent to one end of the optical waveguide 2 in such a way that the reflecting surface 21a of the micro-reflecting mirror 21 is inclined at an angle of about 45° relative to the surface of the substrate 1. The light-emitting device or the light detector 22 is disposed above the micro-reflecting mirror 21 and is optically coupled to the optical waveguide 2. For instance, if it is assumed that a photodiode is disposed as the light-emitting device or the light detector 22, the signal light transmitted through the optical waveguide 2 is reflected by the reflecting surface 21a, so that the travelling direction of the signal light is deflected by about 90° and is incident to the light receiving surface 22a of the photodiode 22 efficiently which converts the signal light into an electrical signal. Instead of the photodiode, a light-emitting diode or semiconductor laser can be disposed as a light source 22, so that the signal light is introduced into the optical waveguide, as a matter of course.

In practical application of this photocoupling, in order to position the micro-reflecting mirror 21 with a high degree of accuracy with respect to one end of the optical waveguide 2, it is preferable to provide guides which are used to position the micro-reflecting mirror 21.

Figure 10:
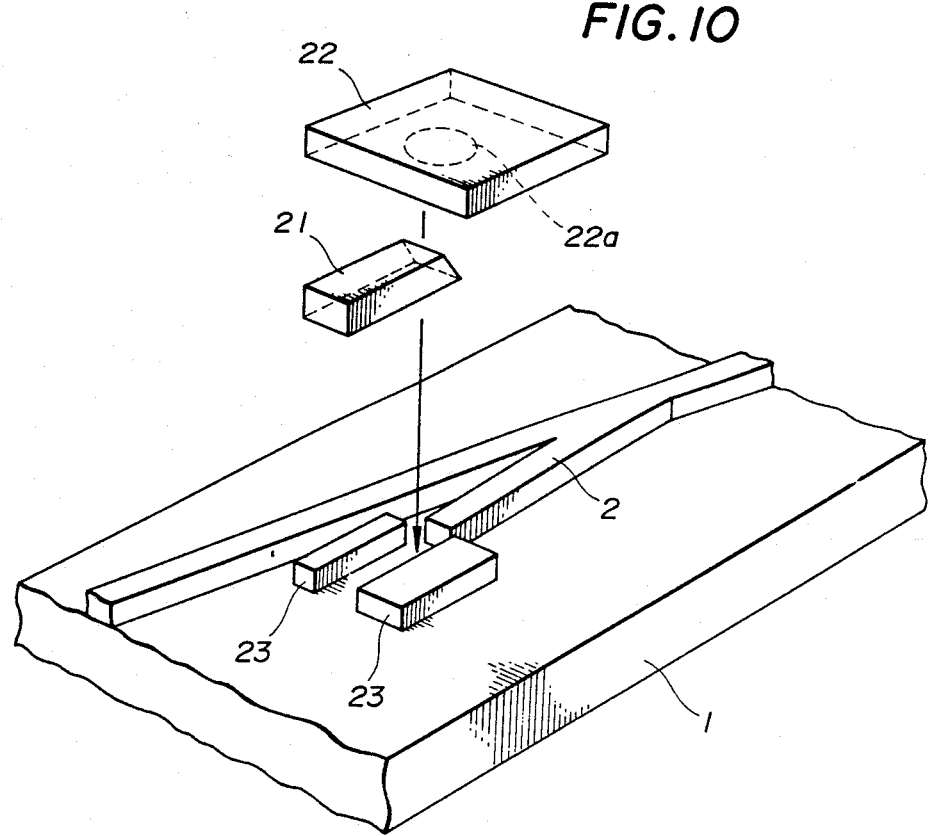
FIG. 10 is an explanatory view showing a sixth embodiment of the present invention.

FIG. 10 shows a further embodiment of the present invention in which guides are utilized in the manner described above. That is, simultaneously with or in advance of the formation of the optical waveguide 2, a pair of micro-reflecting mirror guides 23 are formed, so that the micro-reflecting mirror can be precisely located at a predetermined position of one end of the optical waveguide 2 when the micro-reflecting mirror 21 is inserted between the pair of the guides 23.

The micro-reflecting mirror 22 can be fabricated by polishing one side of a thin glass plate at an angle of about 45° and then coating the polished surface with a reflecting metal film such as Al, Cr, Au or the like or depositing a multi-layer dielectric film on the polished surface. Furthermore, the micro-reflecting mirror 22 can be fabricated by forming a plastic instead of a thin glass. While a light-emitting device or a light detector which is not encapsulated may be used, it is preferable to encapsulate it in a suitable container in order to ensure high reliability and to increase its life time.

Figure 11:
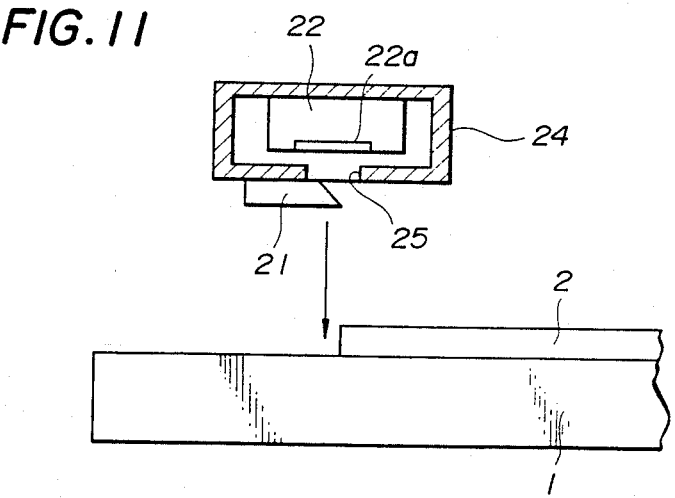
FIG. 11 is an explanatory sectional view showing the sixth embodiment.

In this case, the micro-reflecting mirror 22 can be attached to a package of the light-emitting device or the light detector. In the embodiment as shown in FIG. 11, the micro-reflecting mirror 22 is attached integrally with an aperture portion 25 of a container 24 containing the light-emitting device or the light detector 22 and is disposed on the substrate 1 at one end of the optical waveguide 2. Further, a focusing optical system may be provided in the container 24, so that the optical coupling efficiency can be increased.

A more specific embodiment shown in FIG. 10 will be described in detail. The optical waveguide 2 consists of a high-silica waveguide formed on the silicon substrate 1. That is, a flame hydrolysis deposition method is employed to deposit on the silicon substrate 1 a high-silica optical waveguide film consisting of a buffer layer, a core layer and a cladding layer deposited in this sequence and the undesired portions of the high-silica optical waveguide film are removed by the reactive ion etching process until the surface of the silicon substrate 1 is exposed, so that the optical waveguide 2 and the pair of the guides 23 are formed. The glass compositions and the thicknesses of the buffer layer, the core layer and the cladding layer are as follows:

| buffer layer | SiO$_2$ glass | 15 μm in thickness |
| core layer | Si$_2$—TiO$_2$ glass | 45 μm in thickness |
| cladding layer | SiO$_2$ glass | 10 μm in thickness |

The refractive index difference between the core layer and the buffer layer is 1%. The depth of the film etched by the reactive ion etching process is 70 μm and the width of the optical waveguide is 40 μm. The distance between the pairs of the micro-reflecting mirror guides 23 is 550 μm and the reflecting mirror having a width of 500 μm is inserted therebetween. The micro-reflecting mirror is fabricated by depositing aluminum (Al) on the inclined polished surface of a quartz glass sheet having a thickness of 100 μm and then cutting it into a micro-reflecting mirror having a width of 500 μm. In this embodiment, an Si avalanche photodiode is used as a light detector 22. The light receiving surface has a diameter of 300 μm and the photodiode 22 is encapsulated in a cylindrical container having a diameter of 4 mm. The window pane of the container is made of sapphire glass. When the photodiode 22 is mounted above the micro-reflecting mirror 21 which is inserted between the pair of the guides 23 in such a way that the light receiving surface 22a is directed downward, the light receiving surface 22a can receive almost 100% of the light emitted from one end of the optical waveguide 2.

According to the present invention, it is preferable that a marker for determining the position of the light-emitting device or the light detector 22 and holding the same is marked around the micro-reflecting mirror 21 on the silicon substrate 1, so that the light-emitting device or the light detector is easily mounted on the marker.

Figure 12:
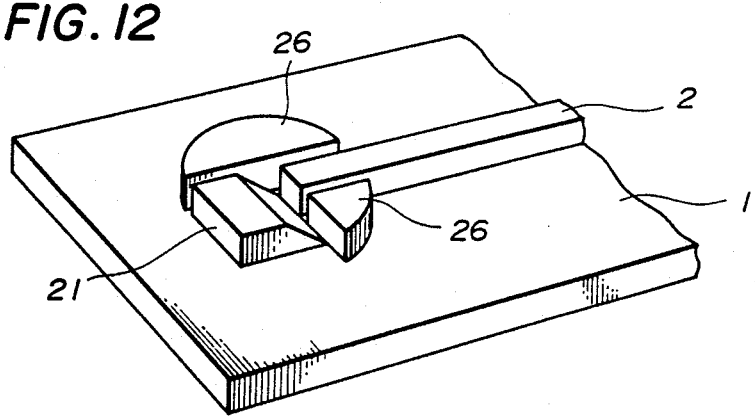
FIG. 12 is a perspective view showing a seventh embodiment of the present invention.

FIG. 12 shows a further embodiment of the present invention in which reference numeral 1 designates a substrate; 2, an optical waveguide; 21, a micro-reflecting mirror; and 26, a marker for a light-emitting device or a light detector. The markers 26 also function as guides for the micro-reflecting mirror 21. In this embodiment, the substrate 1 is made of silicon and the optical waveguide 2 and the markers 26 are composed of a high-silica optical waveguide film. The function of the markers 26 will be described with reference to FIGS. 13, 14 and 15.

Figure 13:
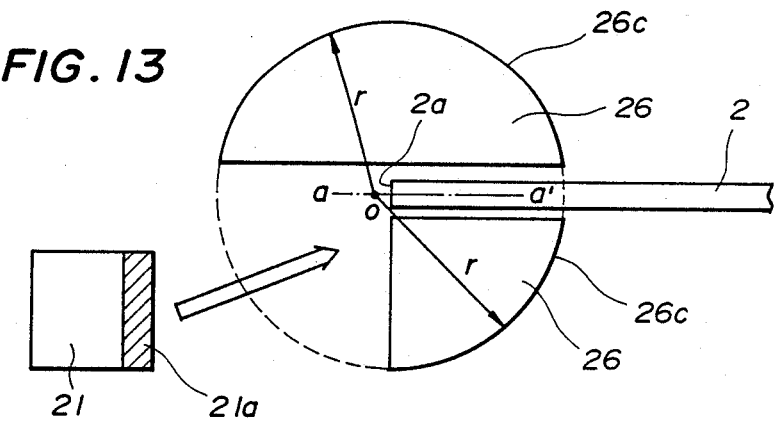
FIG. 13 is an explanatory diagram of the seventh embodiment.

FIG. 13 is a top view of an area surrounding one end surface 2a of the optical waveguide 2. The periphery 26c of the markers 26 coincides with the circumference of a circle of a radius r. The center O of this circle is on the extension of the axis of the optical waveguide 2 and is spaced apart from the end face 2a thereof by the distance l toward the left.

Figure 14:
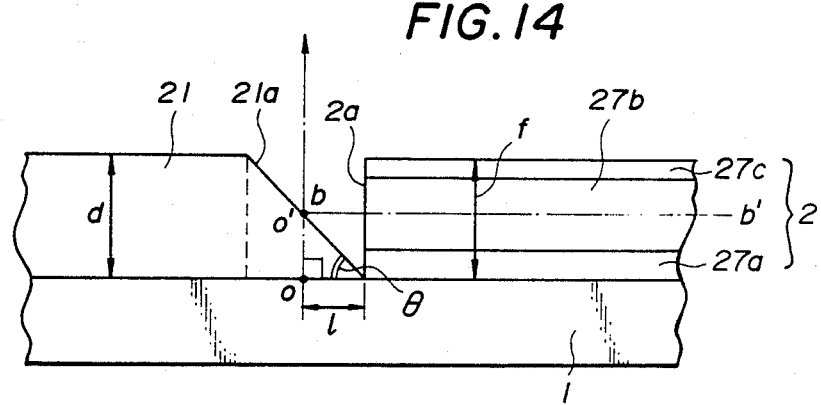
FIG. 14 is a sectional view showing the seventh embodiment.

The length l is determined as shown in FIG. 14. FIG. 14 is a sectional view taken along the line a—a' of FIG. 13. In FIG. 14, reference numeral 1 denotes a substrate; 27c, a cladding layer; 27b, a core layer; 27a, a buffer layer; 21, a micro-reflecting mirror with an inclined reflecting surface 21a. The dash-and-dotted line b—b' is the center axis of the core layer 27b and intersects with the reflecting surface 21a at point 0'. The vertical projection of this point 0' is the center O on the substrate 1 and the center O is the center of the markers 26 shown in FIG. 12.

In this embodiment, the core layer 27b of the optical waveguide 2 has a thickness of 50 μm and the buffer layer 27c thereof has a thickness of 10 μm. The inclination angle θ of the reflecting surface 21a is 45°, so that the distance l between the center O and the end surface 2a of the optical waveguide 2 is 35 μm. The thickness d of the micro-reflecting mirror 21 is determined to be equal to the height f of the optical waveguide 2.

Figure 15:
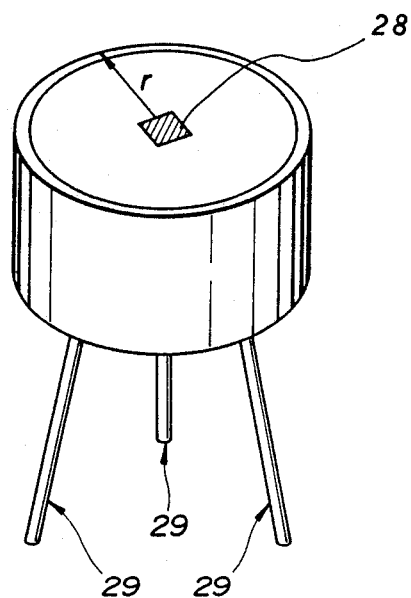
FIG. 15 is a perspective view showing the outer appearance of a light source or a light detector contained in a package.

FIG. 15 shows the outer appearance of a conventional light-emitting device or light detector available on the market. Here, reference numeral 28 denotes a light emitting or receiving surface; and 29, electrical input and output terminals. The radius of this element is r. The radius of the markers 26 shown in FIGS. 12 and 13 is made equal to the radius r. In this embodiment, r=2.5 mm. The light emitting or receiving surface 28 is located at the center of a circle with a radius r.

Because of the arrangement of this embodiment described above, the precise positioning of the light-emitting device or the light detector can be accomplished merely by placing the light-emitting device, or the light detector in such a way that its outer periphery coincides with the periphery of the markers 26. Since the height of the markers is selected substantially equal to the height of the micro-reflecting mirror, the light-emitting device or the light detector can be held in position in a stable manner.

As described above, according to the above-described embodiment, the light-emitting device or the light detector and the optical waveguide can be optically coupled through the micro-reflecting mirror at any desired position on the substrate, so that the degree of freedom in design of optical circuits can be considerably increased. The present invention is especially preferably adapted for coupling the optical waveguide to an optical device having a flat light emitting or receiving surface such as a light-emitting diode, an avalanche photodiode, a PIN photodiode or the like. As a result, the present invention greatly contributes to the realization of various hybrid optical integrated circuits utilizing optical waveguides.

Furthermore, according to the present invention, simultaneously with the formation of the optical waveguide, the guides for the micro-reflecting mirror and the markers upon which the light-emitting device or the light detector is mounted are formed on the same substrate, so that the steps for aligning optical axes of optical components can be considerably simplified and consequently the mass production of hybrid optical integrated circuits can be much facilitated.

As described above, according to the present invention, the waveguide and the guides for correctly aligning an active optical device at a suitable position of the end surface of the optical waveguide are simultaneously formed from the planar high-silica optical waveguide film formed upon the silicon substrate, so that the step for aligning between the optical waveguide, the active optical devices and the input and output optical fibers, which has been the great problem in the fabrication of the hybrid optical integrated circuits, is remarkably simplified.

Spatial wiring using gold wires must be employed in order to supply power to active optical devices. As a result, in the case of a hybrid optical integrated circuit which has a relatively large chip area as compared with electronic integrated circuits, the length of the gold wires is more than a few millimeters, so that there arises a reliability problem because of the instability to mechanical vibrations.

Next, referring to FIGS. 16 and 17A–17D, a further embodiment of the present invention which substantially overcomes the above-described problem will be described.

Figure 16:
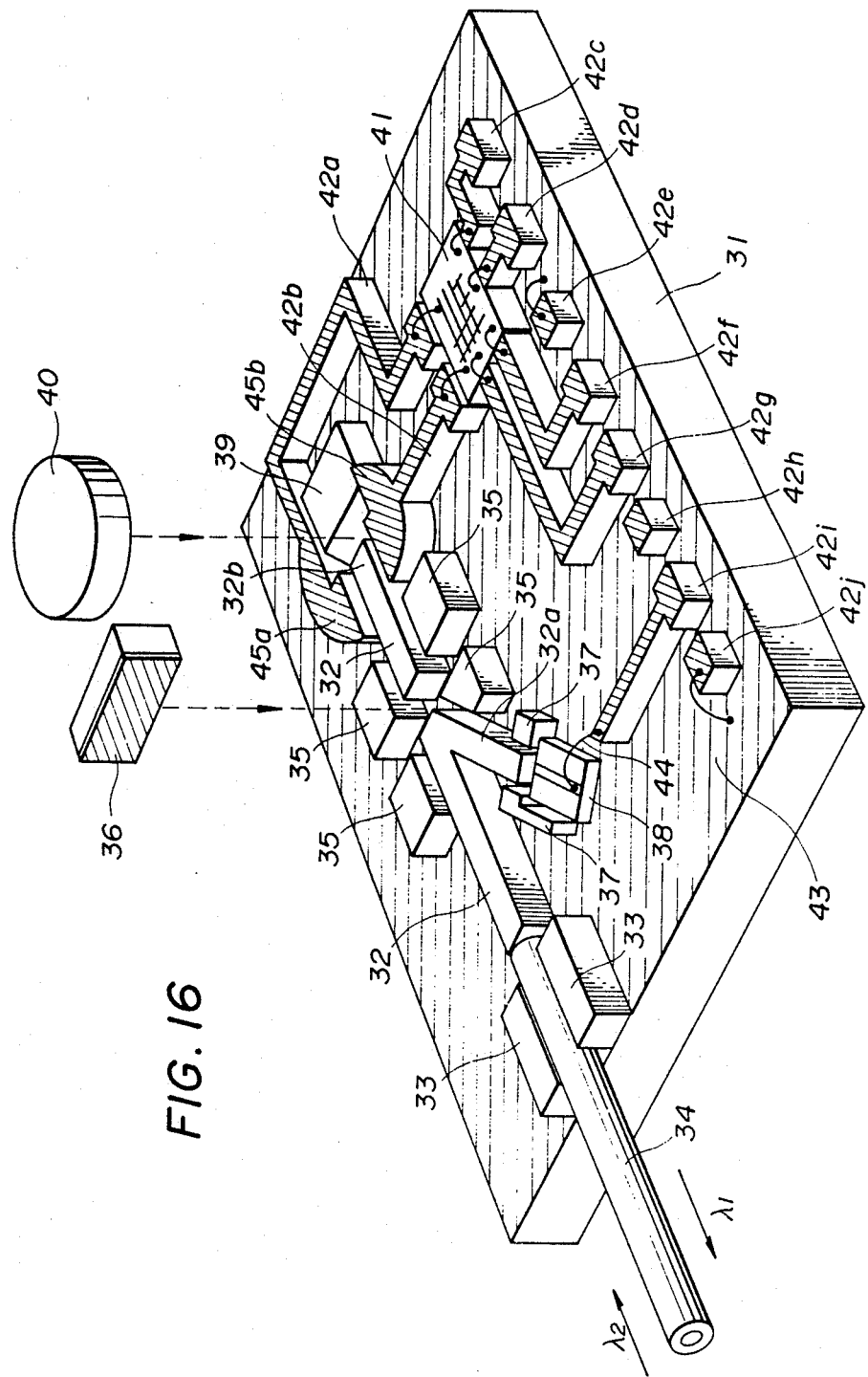
FIG. 16 is a perspective view showing the structure of an optical wavelength multiplexer/demultiplexer as an eight embodiment of a hybrid optical integrated circuit in accordance with the present invention.

FIG. 16 shows a structure of a hybrid optical integrated circuit of the type described above embodying a wavelength multiplexer/demultiplexer adapted for use in a wavelength multiplication communication system. Reference numeral 31 denotes a silicon substrate; 32, a high-silica optical waveguide; 33, a pair of guides for an optical fiber; 34, an input/output optical fiber; 35, two pairs of guides for an interference film filter chip; 36, an interference film filter chip; 37, a pair of guides for a laser diode; 38, a laser diode; 39, a micro-reflecting mirror; 40, an avalanche photodiode (APD); 41, an amplifier chip for APD 40; and 42a, 42b, 42c, 42d, 42e, 42f, 42g, 42h, 42i and 42j, islands for supporting an electrical conductor pattern. The top surfaces of these islands are coated with metal conductor, to form an electrical conductor pattern. The free surface of the silicon substrate 31 is coated with a metal conductor film to form a common electrode surface 43. A gold wire 44 is used as an auxiliary wire for connecting the electrical conductor pattern to the laser diode.

The optical fiber 34 is inserted and securely held between the pair of guides 33 and its optical axis is aligned with one end surface of the optical waveguide 32. The laser diode 38 is bonded to the substrate 31 at a suitable position with respect to the end surface 32a of the optical waveguide 32 by means of the pair of guides 37. The filter chip 36 is inserted between the two pairs of guides 35 in such a way that a predetermined angle is maintained between the filter chip 36 and the optical waveguide 32.

The micro-reflecting mirror 39 is disposed in opposed relationship with the other end surface 32b of the optical waveguide 32, so that the light emitted from the waveguide 32 is deflected by 90° toward the APD 40 disposed on the respective one ends of the electric conductor pattern supporting islands 42a and 42b. The lower surface of the APD 40 has two feeding pads 45a and 45b which in turn are electrically connected to the conductor surfaces on the supporting islands 42a and 42b. The supporting islands 42a and 42b also function as guides for positioning the micro-reflecting mirror 39 and as a marker for positioning the APD 40 at a predetermined position.

In FIG. 16, the amplifier chip 41 and the electrical conductor patterns 42a, 42b, 42c, 42d, 42e, 42f and 42g are connected to each other by means of gold auxiliary wires. Here, it is to be understood that if the amplifier chip 41 is provided with suitable bonding terminals, it can be of course directly connected to the electrical conductor pattern without using auxiliary wires.

In FIG. 16, the optical waveguide 32, the guides 33, 35 and 37 and the electrical conductor pattern supporting islands 42a–42j are formed from the same high-silica glass film or starting material at the same step.

The whole substrate as shown in FIG. 16 can be packaged into a suitable protective housing (not shown).

In operation, a laser drive voltage is applied across the electric conductor patterns 42i and 42j to drive the laser diode 38, so that the signal light with the wavelength $\lambda_1$ is introduced into the optical waveguide 32. The signal light is reflected by the filter chip 36 and directed into the optical fiber 34.

The signal light (with the wavelength $\lambda_2$) transmitted through the optical fiber 34 is introduced into the optical waveguide 32, and then passes through the filter chip 36. The signal light from the filter chip 36 is deflected by the micro-reflecting mirror 39 toward the APD 40. A bias voltage is applied to the APD 40 from the amplifier chip 41 through the electrical conductor patterns 42a and 42b. The signal voltage is amplified by the amplifier chip 41 and is supplied to the electrical conductor patterns 42c and 42d. A power supply voltage is applied to the amplifier chip 41 from the electrical conductor patterns 42f and 42g.

As described above, according to the hybrid optical integral circuit in accordance with the present invention, the optical waveguide, the guides and the islands carrying the electrical conductor patterns are all formed from the same optical waveguide film of high-silica glass at the same time, so that the structure of the hybrid optical integrated circuit is simple. The design of the circuit can be simplified and the mass production is feasible. While in the prior art, long wiring to the leads of a package by means of long gold wires is required, in the present invention, auxiliary wiring by means of gold wires is minimized so that reliability is remarkably improved. Furthermore, the electrical conductor patterns are disposed on the supporting islands 42a–42j of high-silica glass, so that the electrical conductor patterns are completely electrically isolated from the silicon substrate 31. This arrangement is very effective in suppressing crosstalk between the laser diode drive signal and the APD output signal.

Figure 17A:
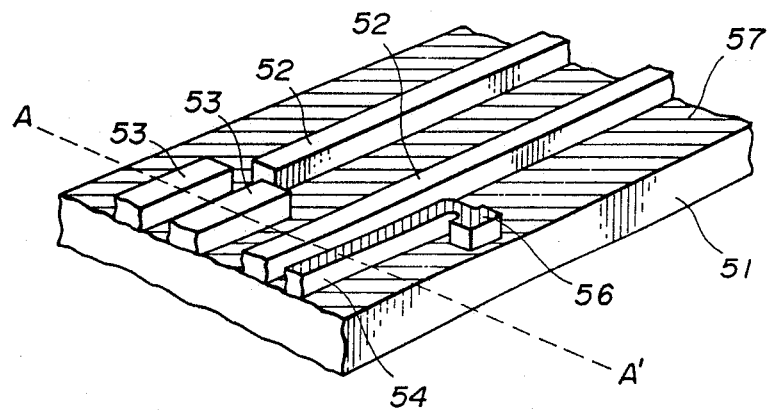
FIG. 17A is a perspective view showing a hybrid optical integrated circuit fabricated by the method in accordance with the present invention.
Figure 17B:
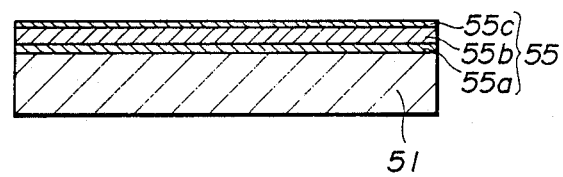
FIGS. 17B–17D are sectional views thereof showing the fabrication steps sequentially.
Figure 17C:
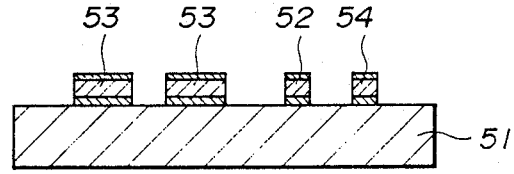
Figure 17D:
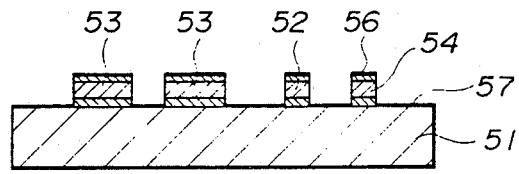

FIGS. 17A–17E show an embodiment of a method for fabricating a hybrid optical integrated circuit in accordance with the present invention. FIGS. 17B, 17C and 17D are sectional views taken along the line A—A' of FIG. 17A and show the fabrication steps sequentially.

In FIG. 17A, reference numeral 51 designates a silicon substrate; 52, optical waveguides; 53, a pair of guides for an optical fiber; and 54, an island carrying an electrical conductor pattern and having a top surface which is coated with a metal conductor film.

In order to fabricate such a hybrid optical integrated circuit, first a high-silica glass film 55 is formed on the silicon substrate 51 as shown in FIG. 17B. The high-silica glass film 55 comprises a buffer layer 55A (15$\mu$m in thickness), a core layer 55b (45 $\mu$m in thickness) and a cladding layer 55c (10 $\mu$m in thickness). Since the whole thickness of the high-silica glass film 55 is as thick as 70 $\mu$m, it is preferable to use a soot process to form the high-silica glass film 55. That is, fine glass particles are synthesized from a glass raw material mainly consisting of $SiCl_4$ by the flame hydrolysis process and are deposited on the substrate 51. Thereafter, the deposited fine glass particles are heated to 1300° C. in an electric furnace, so that the fine glass particles are sintered and consolidated, whereby the transparent glass film 55 is formed. While the fine glass particles are being deposited, the concentration of a dopant supplied to the glass raw material is varied sequentially, so that the above-described three-layer structure is obtained. The high-silica glass film consisting of the three layers as described above functions as an optical waveguide.

Figure 17E:
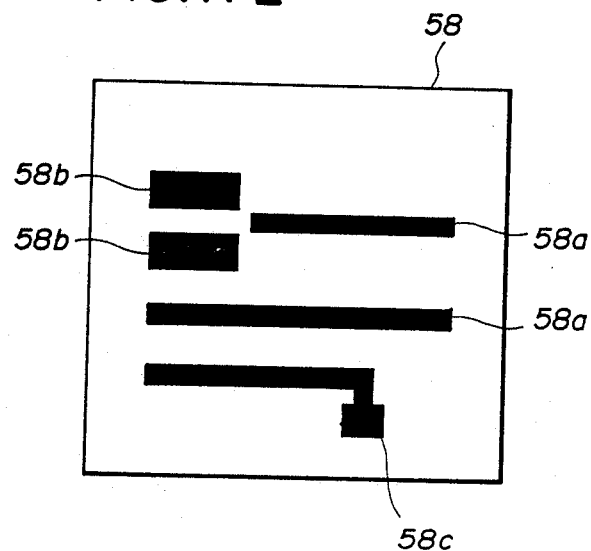
FIG. 17E is a top view showing an example of a mask pattern.

Then, a pattern mask 58 having optical waveguide patterns 58a, guide patterns 58b and an electrical conductor pattern 58c, as shown in FIG. 17E, is arranged on the cladding layer 55c. The undesired portions of the high-silica glass film 55 are removed by the photolithography process using reactive ion etching, so that, as shown in FIG. 17c, the optical waveguides 52, the optical fiber guides 53 and the electrical conductor pattern carrying island 54 are formed on the silicon substrate 51. After this reactive ion etching process, the side surfaces of the optical waveguides 52, the optical fiber guides 53 and the electrical conductor pattern carrying island 54 are substantially vertical.

Figure 17F:
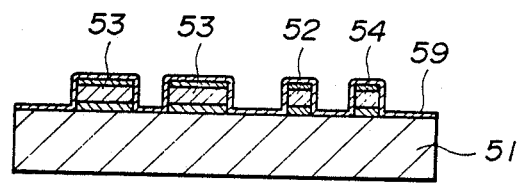
FIGS. 17F and 17G are sectional views used to explain the step for forming side clads.
Figure 17G:
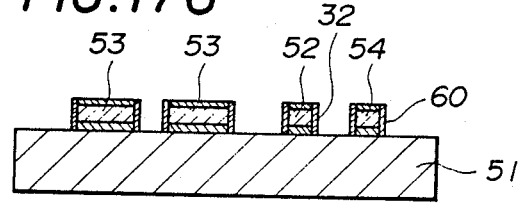

As shown in FIGS. 17F and 17G, if necessary, side cladding layers may be formed over the side surfaces of the optical waveguides 52. In this case, the patterned portions 52–54 as shown in FIG. 17C are covered by an $SiO_2$ glass film 59, as shown in FIG. 17F, which is deposited on the exposed surface of the structure shown in FIG. 17C with a thickness of a few $\mu$m by the sputtering process, CVD process, plasma CVD process or the like. Thereafter, as shown in FIG. 17G, the $SiO_2$ glass film 59 covering the top surfaces of the substrate 51 and the cladding layer is removed by the reactive ion etching process, thereby forming the side cladding layers 60. It is preferable that the $SiO_2$ glass film deposited on the surface of the silicon substrate 51 except the side surfaces of the optical waveguides 52 is selectively removed by carrying out the reactive ion etching process in which a fluorine-series gas is used for a short period of time, so that the silicon substrate 51 can effectively serve as a heat sink of a laser diode or the like which is to be mounted on the silicon substrate 51 in the following step.

Subsequently, as shown in FIG. 17D, an Al-Au composite film which serves as a metal conductor is deposited on the top surface of the substrate 51 by the vacuum evaporation process, thereby forming the electrical conductor pattern 56 and a common electrode plane 57. The metal conductor material slightly adhered to the side surfaces of the optical waveguides 52 and the carrying island 54 can be removed when the substrate is immersed into a metal etching solution for a short period of time.

Further, the metal conductor material is deposited not only on the top surface of the carrying island 54 but also on the top surfaces of the optical waveguides 52 and the guides 53, but such deposited metal conductor material will not cause any adverse effect in practice. The optical waveguides 52 or the guides 53 having the metal conductor material deposited thereon may be used as a part of the electrical conductor pattern carrying islands 54.

After the step as shown in FIG. 17D has been completed, an optical fiber and a laser diode or the like are aligned by the pairs of guides 53 and disposed at predetermined positions, respectively. Then, necessary auxiliary wiring by means of gold wires is accomplished. Thereafter, the silicon substrate 51 is packaged into a protective housing and the fabrication of the hybrid optical integrated circuit in accordance with the present invention is completed.

It is preferable that when the hybrid optical integrated circuit in accordance with the present invention is packaged into a protective housing, the upper surface of the hybrid optical integrated circuit is coated with a resin having a low refractive index such as a silicone resin, a silicone cementing material or the like, so that Fresnel reflection is prevented at the point at which the optical fiber is coupled to the optical waveguide and at the position at which the filter chip is inserted. Furthermore, this coating has the effect that the increase in light loss due to slight roughness or unevenness on the side surfaces of the optical waveguides is prevented.

In practice, when the hybrid optical integrated circuit is molded with a silicone cementing material having a refractive index matched to that of $SiO_2$ glass, the light loss of the optical waveguide is decreased from 0.5 dB/cm (when the side surfaces of the optical waveguide are exposed) to 0.1 dB/cm at the wavelength of 1.3 $\mu$m.

In order to further decrease the light loss of the optical waveguides, the following process can be employed. After the completion of the reactive ion etching process and prior to the vacuum evaporation of the metal conductor material in the steps shown in FIGS. 17B-17D, a step is added in which $SiO_2$ glass films having a thickness of a few $\mu$m are formed as side surface cladding layers on the side surfaces of the optical waveguides 53. In this manner, it becomes possible to accommodate the hybrid optical integrated circuit in accordance with the present invention within a resin having a high index of refraction (for instance, an epoxy resin) in addition to a silicone resin, a silicone bonding agent and the like.

In order to form such side surface cladding layers, in the step as shown in FIG. 17C, after the completion of the reactive ion etching process, an $SiO_2$ film having a thickness of a few $\mu$m is formed over the whole surface of the substrate 51 by the radio frequency sputtering process in which a quartz glass plate is used as a target or by the CVD or plasma CVD process in which silane ($SiH_4$) gas is used as a raw material. Thereafter, the undesired $SiO_2$ film is selectively removed by carrying out the reactive ion etching process for a short period of time, while leaving the $SiO_2$ film deposited on the side surfaces of the optical waveguides.

When the undesired $SiO_2$ film remains on the surface of the silicon substrate 51, it adversely affects the bonding of a laser diode or the like to the silicon substrate in the subsequent step. Therefore, it is undesirable that the undesired $SiO_2$ film remains on the silicon substrate 51. The reason is that the undesired $SiO_2$ film adversely affects the function of the silicon substrate as a heat sink. In the case of the reactive ion etching process, anisotropy of etching is high depending upon the direction of ion emission, so that the $SiO_2$ films on the side surfaces of the optical waveguides can be selectively left by controlling the direction of the substrate in the etching process.

Furthermore, the $SiO_2$ films are also formed on the side surfaces of the optical fiber guides 53 as in the case of the side surfaces of the optical waveguides 52, so that the thickness of the $SiO_2$ film must be taken into consideration when the distance between the guides 53 is determined.

When the thickness of the $SiO_2$ film is equal to or less than 1 $\mu$m, the satisfactory function of the side surface cladding cannot be attained and it is not preferable to mold with a resin having a high refractive index such as an epoxy resin because the optical field is expanded outwardly beyond the side surface cladding layers. The reason is that the light transmitted through the optical waveguide passes through the thin side surface cladding layers into the resin. On the other hand, when the thickness of the $SiO_2$ film is larger than 10 $\mu$m, cracks are likely to be produced in the $SiO_2$ film, and the size of the guides varies over a wide range and consequently the design relying upon a uniform reproducibility becomes difficult. Furthermore, the selective removal of the undesired $SiO_2$ film by the reactive ion etching process becomes difficult. The results of experiments conducted by the inventors show that the minimum thickness of the $SiO_2$ film required is of the order of 2 $\mu$m. When the $SiO_2$ film 2 $\mu$m in thickness was formed as a side surface cladding layer by the radio frequency sputtering process in which a quartz glass plate is used as a target, the light loss of the optical waveguide was less than 0.1 dB/cm at the wavelength of 1.3 m and there was no increase in light transmission loss even when the substrate was molded with an epoxy resin.

In the above-described embodiment of the fabrication method, the optical waveguides 52, the guides 53 and the electric conductor pattern carrying island 54 are formed simultaneously by using a single photomask pattern. Furthermore, the electrical conductor pattern 56 can be formed by a simple process such as the vacuum evaporation process. As a result, reliability and cost are remarkably improved.

So far, the present invention has been described in conjunction with the high-silica optical waveguides formed on the silicon substrate, but it is to be understood that the present invention may be equally applied to the design and fabrication of hybrid optical integrated circuits using other materials for optical waveguides.

As described above, according to the present invention, the optical waveguides, the guides for positioning optical fibers and active optical devices and the electrical conductor patterns can be formed by using a single photomask with a high degree of accuracy, so that assembly is facilitated, reliability is improved and a practical hybrid optical integrated circuit is provided.

Next, a further embodiment will be described in which an optical waveguide film is formed on the surface of a substrate and then is etched, so that an optical waveguide and guides are simultaneously formed, and thereafter a lens and a light-emitting device are securely held in position by means of the guides, whereby the lens and the light-emitting device are located at predetermined positions, respectively, relative to the optical waveguide formed on the substrate.

FIGS. 18–22 show such an embodiment as described above. In this waveguide type optical module, a channel optical waveguide 62 is formed on a substrate 61 and one end of the optical waveguide 62 is arranged opposite a light-emitting device 64 (for instance, a laser diode or a light-emitting diode) via a light-converging spherical lens 63. A lens guide 65 and a light-emitting-device guide 66 are formed on the substrate 61 for aligning and holding the lens 63 and the light-emitting device 64 at predetermined positions, respectively.

The optical waveguides 62 comprises a buffer layer 62a in contact with the substrate 61, a core layer 62b on the buffer layer 62a and a cladding layer 62c on the core layer 62b.

Figure 20:
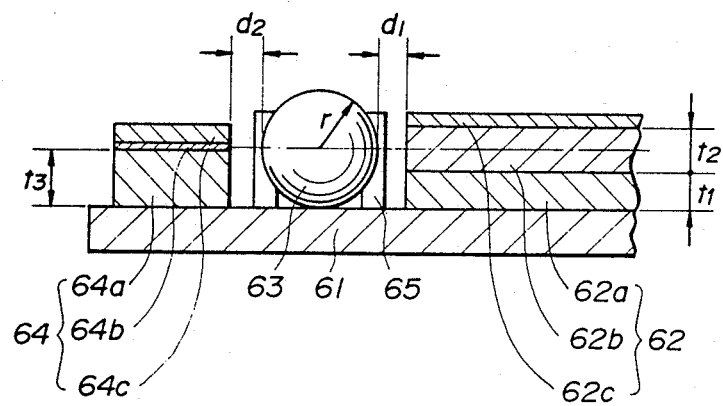
FIG. 20 is a sectional view taken along the line III—III of FIG. 19.

The radius r of the lens 63 is determined to be equal to the sum of the thickness $t_1$ of the buffer layer 62a and one half of the thickness $t_2$ of the core layer 62b, as shown in FIG. 20 ($r = t_1 + t_2/2$).

As shown in FIG. 20, the light-emitting device comprises a base layer 64a in contact with the substrate 61, an active layer 64b on the base layer 64a and a surface layer 64c on the active layer 64b. The thickness $t_3$ of the base layer 64a is determined to be equal to the radius r of the lens 63. Therefore, the active layer 64b, the center of the lens 63 and the central axis of the core layer 62b are at the same height.

Figure 19:
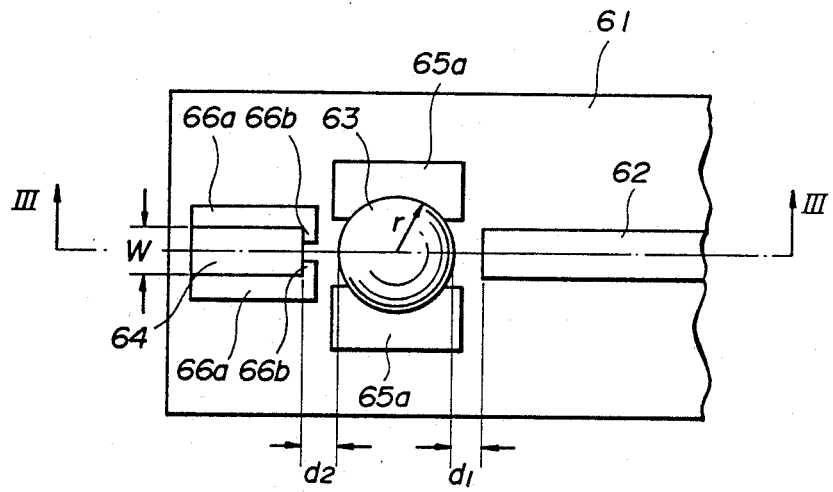
FIG. 19 is a top view thereof.

As shown in FIG. 19, the lens guide 65 comprises a pair of clamping members 65a and the opposing surfaces of these clamping members 65a have partially spherical recesses whose radius of curvature is substantially equal to the radius r of the spherical lens 63. Thus, the longest distance between the clamping members 65a is substantially equal to 2r. The lens 63 can be fitted into the guide 65 in the direction perpendicular to the substrate 61 in such a way that the center of the lens 63 is located on the extension of the central axis (the line III—III in FIG. 19) of the optical waveguide 62 and the distance $d_1$ between the end surface of the optical waveguide 62 and the lens 63 is selected depending upon the focal length of the lens 63.

As shown in FIG. 19, the light-emitting-device guide 66 comprises a pair of parallel clamping members 66a and the distance between these clamping members 66a is substantially equal to the width W of the light-emitting device 64. Projections 66b are extended to each other from the ends closer to the lens 63 and are spaced apart from each other by a predetermined distance. The light-emitting device 64 is fitted into the guide 66 from the direction perpendicular to the substrate 61 or from the end remote from the lens 63 or the guide 66. The distance $d_2$ between the light-emitting device 64 and the lens 63 is selected depending upon the focal length of the lens 63.

Figure 21:
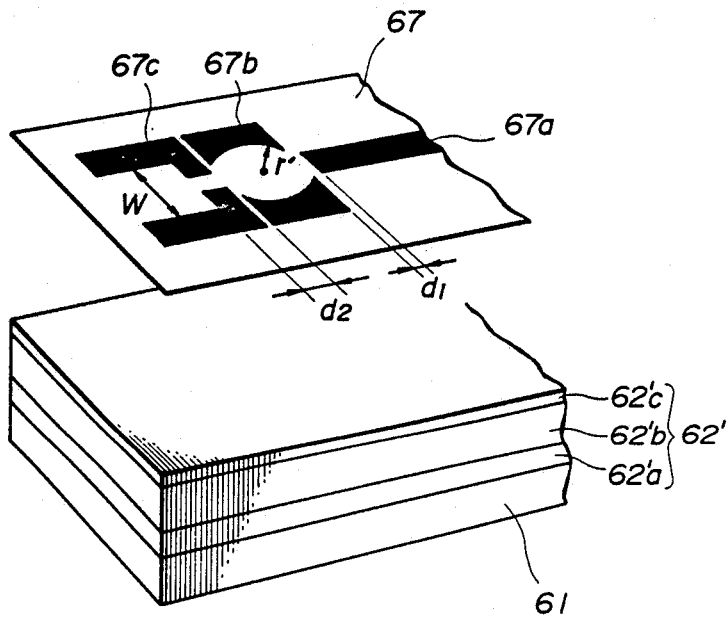
FIGS. 21 and 22 are perspective views used to explain the fabrication steps of the ninth embodiment.

The waveguide type optical module described above may be fabricated as follows. First, as shown in FIG. 21, an optical waveguide film 62' is formed on the substrate 61. The film 62' comprises a buffer layer 62'a, a core layer 62'b and a cladding layer 62'c. In this embodiment, the substrate 61 comprises a silicon substrate and the optical waveguide film 62' comprises a high-silica optical waveguide film. The fabrication method as disclosed in the co-pending Japanese patent application No. 58-147378 mentioned above may be used to form the high-silica optical waveform film. That is, soot-like glass fine particles are synthesized from raw materials such as $SiCl_4$, $TiCl_4$ and deposited on the substrate by the flame hydrolysis process and then the deposited soot-like glass is heated and consolidated into transparent glass.

Figure 18:
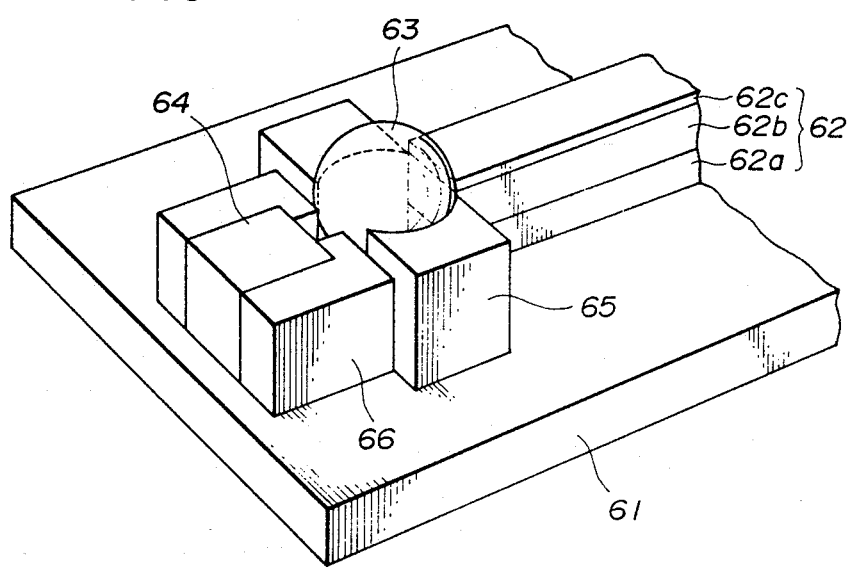
FIG. 18 is a perspective view showing a ninth embodiment of the present invention.
Figure 22:
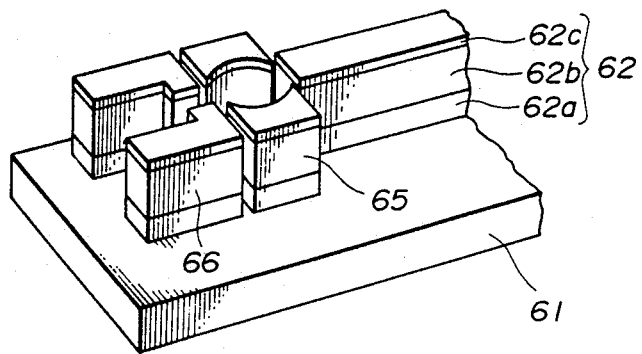

In FIG. 21, reference numeral 67 denotes a photomask having desired patterns. Reference numeral 67a denotes a channel optical waveguide pattern; 67b, a lens guide pattern; and 67c, a light-emitting-device guide pattern. The width of the channel optical guide pattern 67a is 50 $\mu$m. The radius r' of the lens guide pattern 67b is selected to correspond to the radius r of a lens to be used. In like manner, the width of the light-emitting-device guide pattern 67c is selected to correspond to the width of a light-emitting device to be used. The distance $d_1$ between the waveguide 62 and the lens 63 and the distance $d_2$ between the lens 63 and the light-emitting device 64 are selected depending upon the focal length of the lens 63 to be used. By using this mask 67, an AZ resist pattern is formed on an amorphous Si film as a masking material, the reactive ion etching process using a gas mixture consisting of $C_2F_6$ and $C_2H_4$ as an etchant is carried out to remove undesired portions of the high-silica optical waveguide film 62', whereby, as shown in FIG. 22, the optical waveguide 62, the lens guide 65 and the light-emitting-device guide 66 are formed on the substrate 61. Thereafter, the lens 63 and the light-emitting device 64 are fitted into the guides 65 and 66, respectively, whereby the waveguide type optical module as shown in FIG. 18 is formed.

In the case of the waveguide type optical module of the type described above, the lens 63 and the light-emitting device 64 are precisely located at predetermined positions, respectively, relative to the optical waveguide 62 only by inserting the lens 63 and the light-emitting device 64 into the guides 65 and 66, respectively, formed on the substrate 61. Furthermore, the light-emitting device 64 is coupled to the optical waveguide 62 with a high degree of efficiency.

In order to make the function and effects of the present invention more apparent, experimental examples conducted by the inventors will be described.

In the experiment, the edge-type light-emitting diode having a base layer with a thickness $t_3 = 70$ $\mu$m and emitting light from one edge was used as the light-emitting device 64. In order to align the heights of the light-emitting device 64, the lens 63 and the optical waveguide 62, a sapphire ball with the radius $r = 70$ $\mu$m was used as the lens 63. The thickness $t_1$ of the buffer layer 62a of the high-silica channel optical waveguide 62 was 45 $\mu$m; the thickness $t_2$ of the core layer 62b was 50 $\mu$m; and the thickness of the cladding layer 62c was 5 $\mu$m. The light-emitting device 64 and the lens 63 were incorporated and the coupling efficiency between the light-emitting device 64 and the high-silica channel optical waveguide 62 was measured. The measured coupling efficiency was $-10$ dB. When the light-emitting device 64 was directly coupled to the optical waveguide 62 without the use of the lens 63, the coupling efficiency was about $-14$ dB through $-13$ dB. Therefore, it is seen that when the lens 63 is incorporated, the coupling efficiency was improved by 3 dB or more. In this embodiment, the silicon substrate 61 also serves as a heat sink for the light-emitting device 64.

Figure 23:
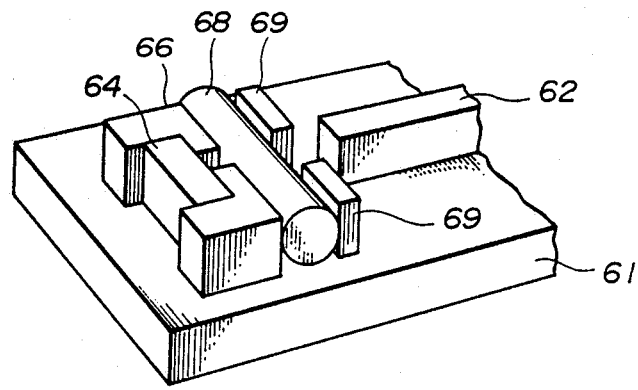
FIG. 23 is a perspective view showing a tenth embodiment of the present invention.

FIG. 23 shows a further embodiment of the present invention in which instead of the spherical lens 63 described above, a cylindrical lens 68 is used. Since the position in the axial direction of the cylindrical lens 68 can be freely selected relative to the optical waveguide 62, a lens guide 69 can have any form as long as the lens guide 69 is so located relative to a light-emitting device guide 66 that the cylindrical lens 68 is clamped between the guides 66 and 69.

Figure 24:
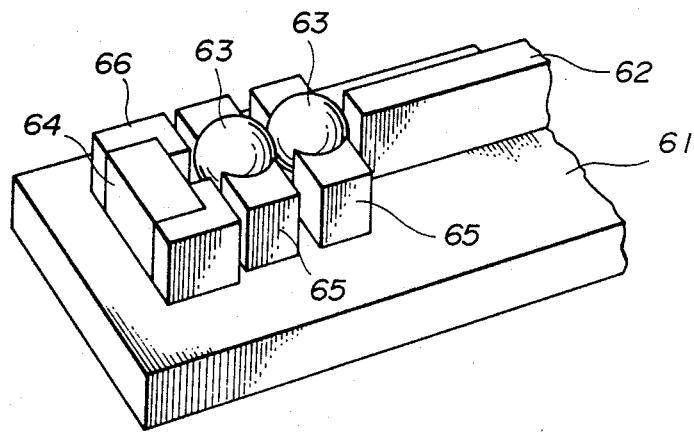
FIG. 24 is a perspective view showing an eleventh embodiment of the present invention.

FIG. 24 shows a further embodiment of the present invention in which two spherical lenses 63 of the type described above with reference to FIG. 18 are disposed in series between the light-emitting device 64 and the optical waveguide 62. Therefore, this embodiment is a composite-lens-waveguide type optical module.

Both of the waveguide type optical modules as shown in FIGS. 23 and 24 can be fabricated in a manner substantially similar to that described above with respect to the embodiment shown in FIG. 18. According to this embodiment, the alignment between the light-emitting device 64, the spherical lens 63 or cylindrical lens 68 and the optical waveguide 62 can be attained only by inserting the lens 63 or 68 and the light-emitting device 64 into the guides 65 or the space between the guides 66-69 and the guide 66, respectively, and a high degree of coupling efficiency can be obtained.

So far explanations of the embodiments of the present invention have been made of the optical waveguide 62 optically coupled to the light-emitting device 64, but it is to be understood that instead of the light-emitting device 64, a light detector can be incorporated. It is further to be understood that the present invention is not limited to the shapes of the guides 65, 66 and 69 shown in FIGS. 18-24 and that guides may have any suitable shapes which can be formed by etching.

As described above, according to the present invention, the alignment guides are formed on the substrate so that the lens or lenses and the light-emitting device are disposed at predetermined positions, respectively, relative to the optical waveguide on the substrate, and the lens or lenses and the light-emitting device can be securely held in position by these guides. As a result, the steps for disposing the lens or lenses and the light-emitting device at their respective predetermined positions are much simplified, so that the assembly is considerably facilitated. Therefore, it becomes possible to provide hybrid optical integrated circuits in which the light-emitting device and the optical waveguide are formed on the same substrate with a high coupling efficiency.

Next, a further embodiment of the present invention will be described in which a high-silica glass optical waveguide is formed on a silicon substrate and then etched by the photolithography process until the surface of the silicon substrate is exposed, whereby a desired optical waveguide pattern and an optical-fiber guide are simultaneously formed and thereafter at least a portion of the silicon substrate is etched to a desired depth in the vicinity of the optical fiber guide, so that the core of the optical fiber is precisely aligned with the core of the optical waveguide when the optical fiber is inserted into the optical fiber guide.

Figure 25:
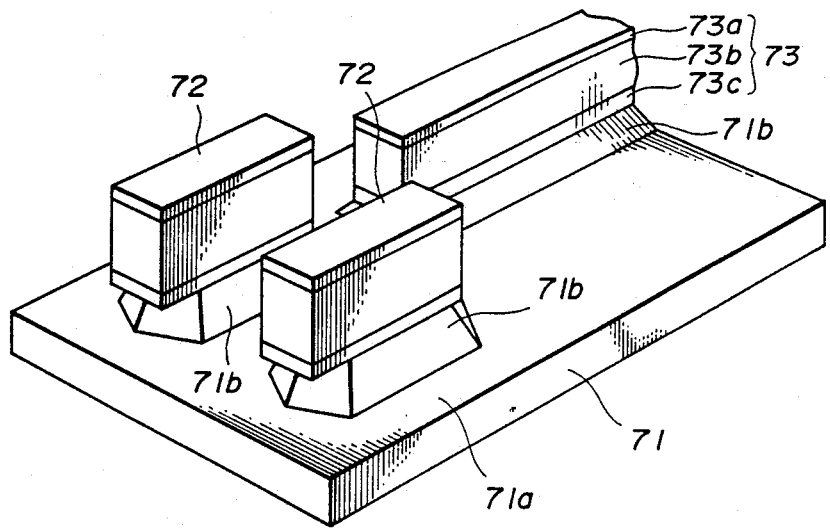
FIG. 25 is a perspective view showing an optical circuit with guides in a twelfth embodiment of the present invention.

FIG. 25 is a perspective view showing the an embodiment of the type described above; that is, an optical circuit with an optical fiber guide. Reference numeral 71 denotes a silicon substrate; 71a, an Si (100) surface; 71b, an Si (111) surface defined by etching; 72, a fiber guide; and 73, an optical waveguide having a cladding layer 73a, a core layer 73b and a buffer layer 73c. Both the optical waveguide 73 and the fiber guide 72 are made of high-silica glass.

Figure 26:
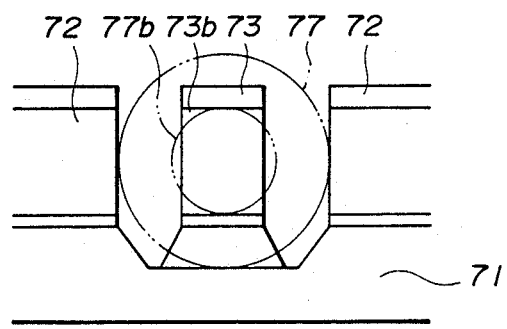
FIG. 26 is a view used to explain the dimensional relationships among the guides, optical waveguide and optical fiber of the optical circuit shown in FIG. 25.

FIG. 26 shows the positional relationship between the fiber guide 72, the core layer 73b of the optical waveguide 73 and the core 77b of an optical fiber 77 to be coupled to the optical waveguide 73. The distance between the guides 72 is substantially equal to the outer diameter of the optical fiber 77 and the depth of the guide 72 can be adjusted by etching the silicon substrate 71, so that the core 77b of the optical fiber 77 is aligned with the core layer 73b of the optical waveguide 73. Therefore, when the optical fiber 77 is inserted between the guides 72, the optical fiber 77 is automatically optically aligned with the optical circuit.

Figure 27A:
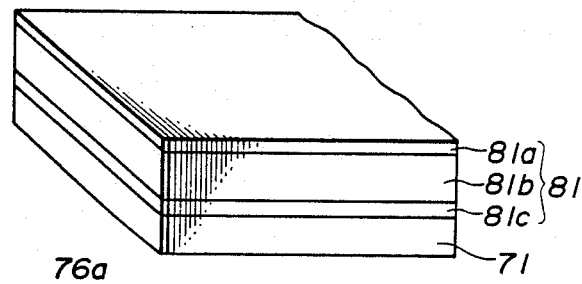
FIGS. 27A-27C are perspective views used to explain the fabrication steps of an optical circuit with guides.
Figure 27B:
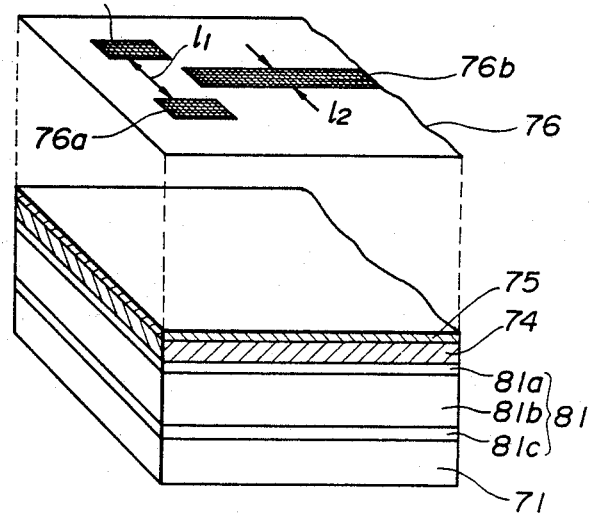
Figure 27C:
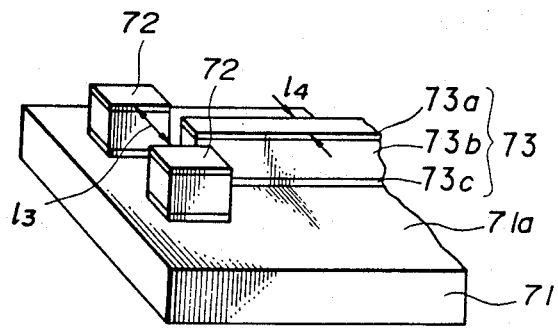

FIGS. 27A–27C show the steps for fabricating the optical circuit with a fiber guide of the type just described above.

FIG. 27A shows the step for forming a high-silica optical waveguide film 81 on the silicon substrate 71. According to this embodiment, an Si (100) substrate is used as the silicon substrate 71 and raw materials such as $SiCl_4$, $TiCl_4$, $GeCl_4$, $BCl_3$, $PCl_3$ or the like are subjected to the flame hydrolysis reaction to form the high-silica optical waveguide film 81 on the silicon substrate 71. The high-silica optical waveguide film 81 is 53 μm in thickness and comprises a cladding layer 81a (3 μm in thickness), a core layer 81b (45 μm in thickness) and a buffer layer 81c (5 μm in thickness).

FIG. 27B shows the step for etching the high-silica optical waveguide film 81 to form the optical waveguide and fiber guides with desired patterns. To this end, first, an amorphous Si film 74 is formed over the high-silica optical waveguide film 81 and then an AZ series photoresist 75 is coated over the surface of the film 74. Thereafter, a photomask 76 is used so that the AZ series photoresist 75 is patterned by the photolithography process. The photomask 76 has fiber guide patterns 76a which are spaced apart from each other by the distance $l_1 = 120$ μm. Reference numeral 76b denotes an optical waveguide pattern having the width $l_2$ of 45 μm. When patterning the AZ series resist 75, the fiber guide patterns 76a are so placed as to be substantially in parallel with the orientation (110) of the silicon substrate 71. Thereafter, the reactive ion etching process is carried out with the patterned AZ series resist being used as a mask and with a $CBrF_3$ etchant, so that the amorphous Si film 74 is patterned.

Next, the reactive ion etching process is carried out with the patterned amorphous Si film being used as a mask and with an etchant consisting of a mixture of $C_2F_6$ and $C_2H_4$, so that, as shown in FIG. 27C, the fiber guides 72 and the optical waveguide 73 formed by the patterned high-silica optical waveguide film are defined on the silicon substrate 71. The high-silica optical waveguide film 81 must be etched to the depth of 53 μm. In the case of the etching step, the width of the pattern is slightly decreased, so that the distance $l_3$ between the guides becomes about 125 μm and the width $l_4$ of the optical waveguide becomes about 40 μm.

Thereafter, the silicon substrate 71 is etched to adjust the depth of the guides. In this step, the silicon substrate 71 is immersed into an alkali etching solution such as ethylene-di-amine-pyrocatechol. Here, the guides 72 and the optical waveguide 73 consisting of the high-silica optical waveguide film serve as masks so that the silicon substrate is anisotropically etched. When the above-described etching solution is used, the relations between the silicon crystal plane and the etching speed become (100) : (110) : (111) = 50 : 30 : 3 μm/h. As a result, when the (111) plane is exposed, this plane is not etched further. Therefore, the optical circuit as shown in FIG. 25 is obtained. In this embodiment, the silicon substrate 71 is etched to the depth of 35 μm by the above-described method. As a result, as shown in FIG. 26, when the optical fiber 77 having an outer diameter of 125 μm and a core diameter of 50 μm is inserted between the guides, it can be optically aligned with the high-silica optical waveguide 73.

Since the step for etching the silicon substrate 71 is introduced, it suffices to etch the high-silica optical waveguide film 81 to the depth of 53 μm. On the other hand, in order to form the guides for an optical fiber having an outer diameter of 125 μm by etching only the high-silica optical waveguide film, the high-silica optical waveguide film 81 must be etched to the depth of about 90 μm.

Figure 28:
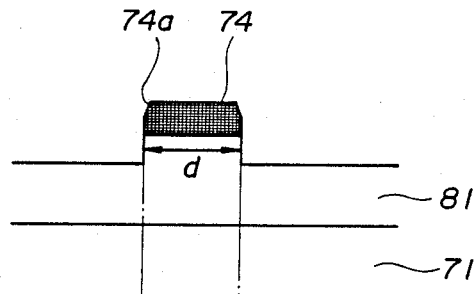
FIGS. 28A-28C are schematic diagrams showing the decrease in the width of an optical circuit.
Figure 28:
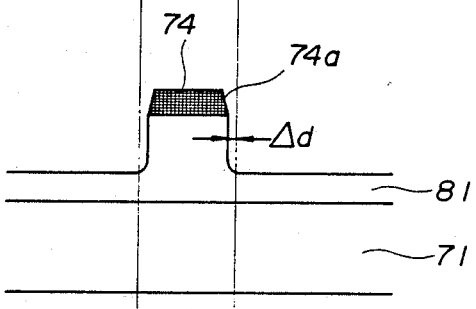
Figure 28:
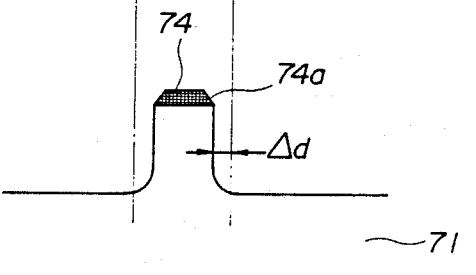

As described in the step with reference to FIG. 27C, the width of the pattern is slightly reduced, so that the width of the finally formed pattern becomes narrower than the width of the photomask pattern designed initially. The mechanism causing the reduction in pattern width is shown in FIGS. 28A–28C. FIG. 28A shows the high-silica optical waveguide film 81 etched to a relatively shallow depth. In the case of the reactive ion etching process, the sharp portions of the amorphous silicon mask 74 as indicated by the edges 74a of the mask 74 tend to be etched at a faster rate than the other portions. Since the mask 74 is substantially etched at its edges 74a as shown in FIG. 28A, verticality of the side surfaces of the mask 74 is degraded. However, when the depth of etching is shallow, the high-silica optical waveguide film 81 underlying the mask 74 is not adversely affected so that the width d of the pattern formed by the etching process is equal to the width of the photomask.

On the other hand, when the depth of etching is relatively increased as shown in FIG. 28B, verticality of the side surfaces 74a of the amorphous silicon mask 74 is degraded so that the pattern width is decreased by 2Δd. FIG. 28C shows that the depth of etching is further increased. Verticality of the side surfaces 74a of the mask 74 is degrated to a greater extent than that shown in FIG. 28A or 28B, so that the decrease 2Δd' (>2Δd) of the pattern width is further increased and furthermore accelerated.

Figure 29:
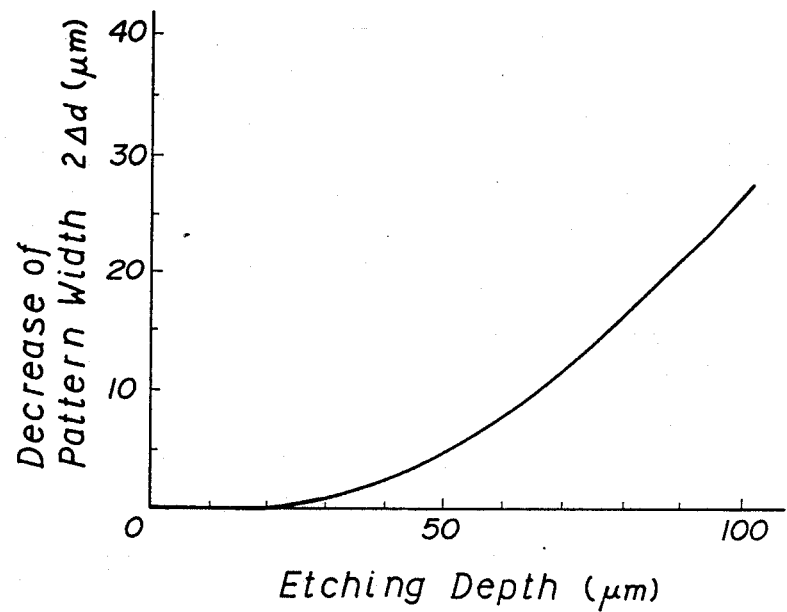
FIG. 29 is a graph illustrating the relationship between the depth of etching and the decrease in the width of a pattern.

FIG. 29 shows the relationship between the depth of etching and the decrease in the pattern width. It is readily seen from FIG. 29 that the decrease in the pattern width is of the order of about 5 μm when the depth of etching is 50 μm. When the depth of etching is increased to 90 μm, the decrease in pattern width reaches as large amount as 20 μm.

According to this embodiment, the guides for the optical fiber having an outer diameter of 125 μm can be formed with a high degree of accuracy. The results of the measurements of an optical circuit in which the guides were formed at both ends of the optical waveguide having a length of 15 mm and a light-emitting diode having a wavelength of 0.85 μm was used as a light source, show that the total coupling loss including the input and output coupling losses was 1.9 dB. For the sake of comparison, the coupling loss was also measured when the ends of the optical fibers were coupled to the end surfaces of the optical waveguide in the conventional butt-jointing manner. The latter coupling loss was substantially equal to the former coupling loss of 1.9 dB. Therefore, it is apparent that a highly efficient coupling can be attained by the method of the present invention. In this embodiment, the core of the optical waveguide formed in the manner described above is 40 μm in width and 45 μm in height. This size of the core corresponds to dimensions when the coupling loss becomes substantially minimum in the case that a graded index fiber (50 GI fiber) with a core diameter of 50 μm, an optical waveguide (step index type) and a 50 GI fiber are connected in series in this order.

As described above, according to the present invention, the optical fiber is inserted between the alignment guides formed simultaneously with the optical circuit in order to couple the optical fiber to the optical circuit. Therefore, the coupling between the optical fiber and the optical circuit can be accomplished with a high degree of coupling efficiency without any adjustment. Furthermore, according to the present invention, the portion in the vicinity of the guides of the silicon substrate is etched to a suitable depth, so that the coupling to a conventional optical fiber can be accomplished in a simple manner. Moreover, according to the present invention, in the step of forming the optical circuit and the guides, the high-silica optical waveguide film is etched to a minimum depth required and a predetermined depth is sufficiently obtained by additionally etching the silicon substrate. As a result, the decrease in pattern width which is one of the problems encountered when a deep etching is performed by reactive ion etching can be considerably minimized, so that the optical components can be formed with a high degree of accuracy.

What is claimed is:

1. A hybrid optical integrated circuit comprising: a silicon substrate;
    at least one optical fiber having a core;
    at least one optical device; and
    a single silica-based glass film affixed to said silicon substrate, said silica-based film having at least a buffer layer and a core layer, and including
    at least one planar optical waveguide having buffer and core portions forming a first part of the buffer and core layers respectively of said silica-based glass film;
    at least one optical fiber guide forming a second part of said silica-based glass film for aligning said optical fiber on said substrate at a first predetermined position relative to said optical waveguide for optical coupling therebetween; and
    at least one optical device guide forming a third part of said silica-based glass film for aligning said optical device on said substrate at a second predetermined position relative to said optical waveguide for optical coupling therebetween.

2. A hybrid optical integrated circuit comprising:
    a silicon substrate;
    at least one optical fiber having a core;
    at least one optical device;
    a first electrically conductive film affixed to a surface of said silicon substrate;
    a single silica-based glass film affixed to said surface of said silicon substrate, said silica-based film having at least a buffer layer and a core layer, and including
    at least one planar optical waveguide having buffer and portions forming a first part of the buffer and core layers respectively of said silica-based glass film;
    at least one optical fiber guide forming a second part of said silica-based glass film for aligning said optical fiber on said substrate at a first predetermined position relative to said optical waveguide for optical coupling therebetween;
    at least one optical device guide forming a third part of said silica-based glass film for aligning said optical device on said substrate at a second predetermined position relative to said optical waveguide for optical coupling therebetween; and
    a plurality of glass island comprising a fourth part of said silica-based glass film, each of said glass islands having a first surface disposed on said silicon substrate;
    second electrically conductive films each affixed to a second surface of at least one of said plurality of glass islands; and
    at least one electrically conductive member connecting said optical device to at least one of said first and second electrically conductive films.

3. A hybrid optical integrated circuit as claimed in claim 1, wherein the thickness of the core portion of said optical waveguide is substantially equal to the diameter of the core of said optical fiber, and the thickness of the buffer portion of said optical waveguide is such that the center of the core of said optical fiber substantially coincides with the center of the core portion of said optical waveguide when said optical fiber is engaged with said optical fiber guide.

4. A hybrid optical integrated circuit as claimed in claim 1, wherein the width and thickness of the core portion of said optical waveguide are each 50±5 μm, and wherein input and output optical fibers are coupled to said optical waveguide.

5. A hybrid optical integrated circuit as claimed in claim 1, wherein said optical waveguide is of the step index type, the width and thickness of the core portion of said optical waveguide are each 40 ±3 μm, and wherein input and output optical fibers are coupled to said optical waveguide.

6. A hydrid optical integrated circuit as claimed in claim 1, wherein said optical waveguide is of the graded index type in the direction of the thickness thereof; the thickness and width of the core portion of said optical waveguide are 50±5 μm and 40±3 μm, respectively; and wherein input and output optical fibers are coupled to said optical waveguide.

7. A hybrid optical integrated circuit as claimed in claim 1, wherein a micro-reflecting mirror with a reflecting surface inclined at about 45° relative to the surface of said substrate is disposed at a position adjacent to the end surface of said optical waveguide so that said optical waveguide and said optical device are optically coupled to each other through said micro-reflecting mirror.

8. A hybrid optical integrated circuit as claimed in claim 7, wherein a marker for determining the position of said optical device and for holding said optical device is disposed on said substrate around said micro-reflecting mirror, so that said optical device is mounted on said marker.

9. A hybrid optical integrated circuit comprising: a silicon substrate;
at least one optical fiber having a core;
at least one optical device;
a single silica-based glass film affixed to said silicon substrate, said silica-based film having at least a buffer layer and a core layer, and including
at least one planar optical waveguide having buffer and core portions forming a first part of the buffer and core layers respectively of said silica-based glass film;
at least one optical fiber guide forming a second part of said silica-based glass film for aligning said optical fiber on said substrate at a first predetermined position relative to said optical waveguide for optical coupling therebetween; and
at least one optical device guide forming a third part of said silica-based glass film for aligning said optical device on said substrate at a second predetermined position relative to said optical waveguide for optical coupling therebetween;
a lens disposed at one end surface of said optical waveguide for optically coupling said optical device thereto; and
a lens guide disposed on said silicon substrate for aligning said lens at a predetermined position relative to said optical waveguide.

10. A hybrid optical integrated circuit comprising:
a silicon substrate;
at least one silica-based glass planar optical waveguide having core and buffer portions, said optical waveguide being affixed to said silicon substrate;
at least one optical fiber having a core and at least one optical device, each of said optical fiber and said optical device being coupled to said optical waveguide; and positions, respectively, relative to said optical waveguide, at least a portion of said silicon substrate in the vicinity of said optical fiber guide having a predetermined depth, whereby when said optical fiber is inserted into said optical fiber guide, the core of said optical fiber is optically aligned with the core portion of said optical waveguide.

11. A hybrid optical integrated circuit as claimed in claim 1 wherein said optical waveguide has side surfaces, and wherein said side surfaces are provided with cladding.

12. A hybrid optical integrated circuit as claimed in claim 1, wherein the junction between said optical waveguide and said optical fiber and the junction between siad optical waveguide and said optical device are covered with a refractive-index-matching agent.

* * * * *